United States Patent
Centonza et al.

(10) Patent No.: US 12,375,990 B2
(45) Date of Patent: Jul. 29, 2025

(54) RADIO NETWORK NODE, CORE NETWORK NODE AND METHODS IN A WIRELESS COMMUNICATIONS NETWORK

(71) Applicant: Telefonaktiebolaget LM Ericsson (publ), Stockholm (SE)

(72) Inventors: Angelo Centonza, Granada (ES); Peter Hedman, Helsingborg (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 449 days.

(21) Appl. No.: 17/801,931

(22) PCT Filed: Feb. 22, 2021

(86) PCT No.: PCT/SE2021/050146
§ 371 (c)(1),
(2) Date: Aug. 24, 2022

(87) PCT Pub. No.: WO2021/173060
PCT Pub. Date: Sep. 2, 2021

(65) Prior Publication Data
US 2023/0108950 A1    Apr. 6, 2023

Related U.S. Application Data

(60) Provisional application No. 62/981,578, filed on Feb. 26, 2020.

(51) Int. Cl.
*H04W 36/14*    (2009.01)

(52) U.S. Cl.
CPC .................... *H04W 36/14* (2013.01)

(58) Field of Classification Search
CPC ...................................................... H04W 36/14
See application file for complete search history.

(56) References Cited

U.S. PATENT DOCUMENTS

2018/0367980 A1* 12/2018 Lee ......................... H04L 67/51

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 417 pages.
(Continued)

*Primary Examiner* — Justin Y Lee
(74) *Attorney, Agent, or Firm* — Weisberg I.P. Law, P.A.

(57) ABSTRACT

A method performed by a Radio Access Network (RAN) node for handling a service request from a User Equipment, UE, in a wireless communications network. The RAN node supports a first network slice in a first Area, A1. The RAN node connects (902) to the UE via A1. The RAN node sends (903) to a Core Network (CN) node, a service request from the UE. The service request relates to one or more network slices that the UE requests in a certain Area. The RAN node receives (904) an indication from the CN node. The indication indicates the one or more network slices requested by the UE together with any one or more out of: —A list of network slices that are allowed to be accessed by the UE in the current A1, and—an indication of a new area priority policy associated to the one or more network slices that are requested by the UE. The RAN node decides (905) how to handle the service request from the UE based on the indication received from the CN node.

18 Claims, 19 Drawing Sheets

(56) References Cited

OTHER PUBLICATIONS

3GPP, "3rd Generation Partnership Project; Technical Specification Group Core Network and Terminals; Non-Access- Stratum (NAS) protocol for 5G System (5GS); Stage 3 (Release 16)", 3GPP TS 24.501 V16.3.0, Dec. 2019, 1-646.

3GPP, "3rd Generation Partnership Project; Technical Specification Group Services and System Aspects; 3GPP System Architecture Evolution (SAE); Security architecture (Release 16)", 3GPP TS 33.401 V16.1.0, Dec. 2019, 1-165.

3GPP, "3rd Generation Partnership Project; Technical Specification Group Radio Access Network; NG-RAN; NG Application Protocol (NGAP) (Release 16)", 3GPP TS 38.413 V16.0.0, Dec. 2019, 1-335.

3GPP, "3rd Generation Partnership Project; Technical Specification Group Radio Access Network; NG-RAN; Architecture description (Release 15)", 3GPP TS 38.401 V15.5.0, Mar. 2019, 1-39.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

GSM Association, "Generic Network Slice Template Version 2.0", Official Document NG.116—Generic Network Slice Template, Oct. 16, 2019, 1-61.

Huawei, et al., "Network slicing for E-UTRA connected to 5GC", 3GPP TSG-RAN WG2 #98, R2-1705711, Hangzhou, China, May 15-19, 2017, 1-4.

Huawei, et al., "Slice Availability for Cell Reselection", 3GPP TSG-RAN WG2#100 Meeting, R2-1712388, Revision of R2-1710221, Reno, Nevada, US, Nov. 27-Dec. 1, 2017, 1-3.

LG Electronics Inc., "Consideration on Allowed NSSAI in NG-RAN", 3GPP TSG-RAN WG3 Meeting #100, R3-183063, Busan, Korea, May 21-25, 2018, 1-7.

Qualcomm Incorporated, "TS 23.501: Applicability of UE slicing configuration in roaming scenarios", SA WG2 Meeting #S2-123, S2-176949, (revision of S2-17xxxx), Ljubljana, Slovenia, Oct. 23-27, 2017,, 1-10.

Samsung, et al., "Key Issue on 5GC assisted cell selection to access network slice", A WG2 Meeting #136 Ad-hoc, S2-2001467, (was S2-2000691), Incheon, Korea, Jan. 13-17, 2020, 1-4.

* cited by examiner

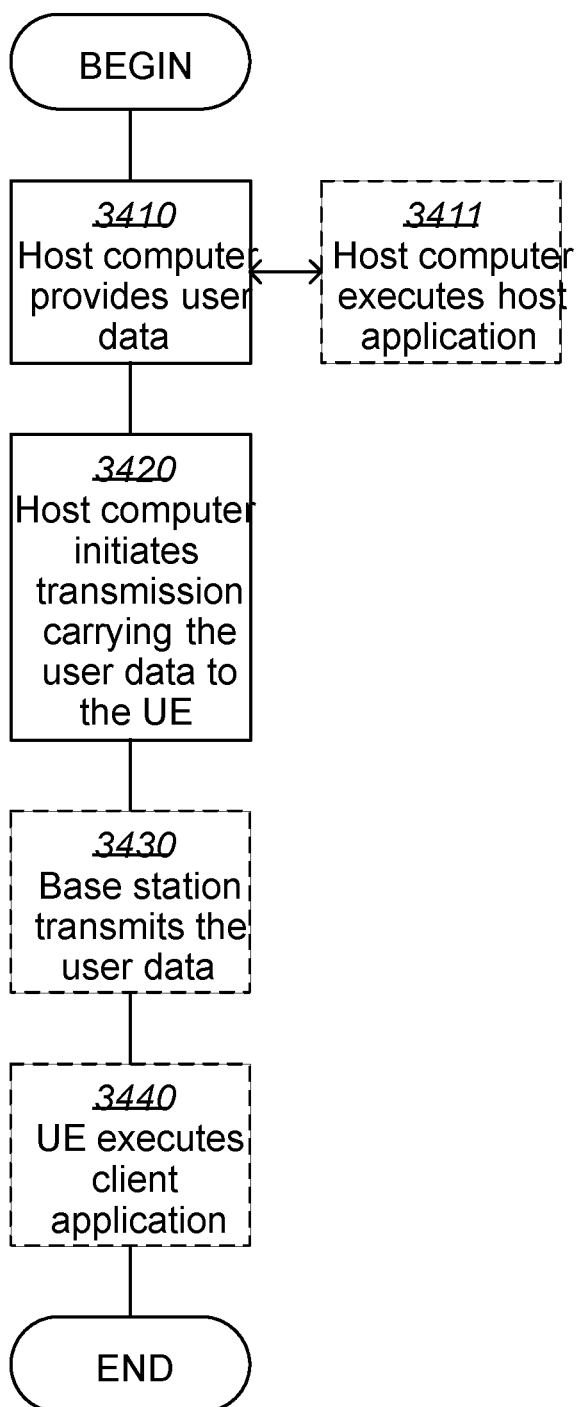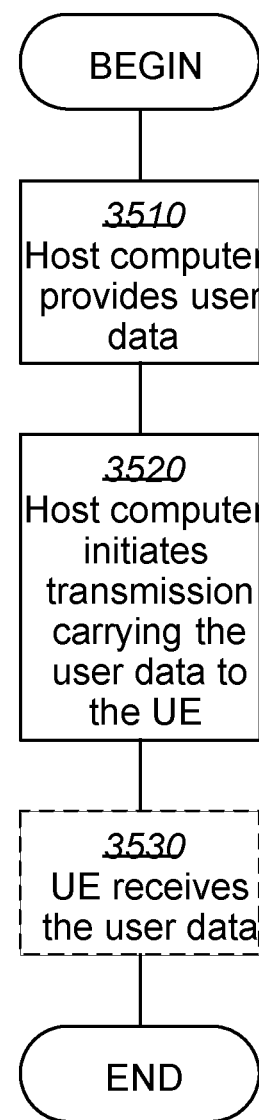
FIG. 20
FIG. 21

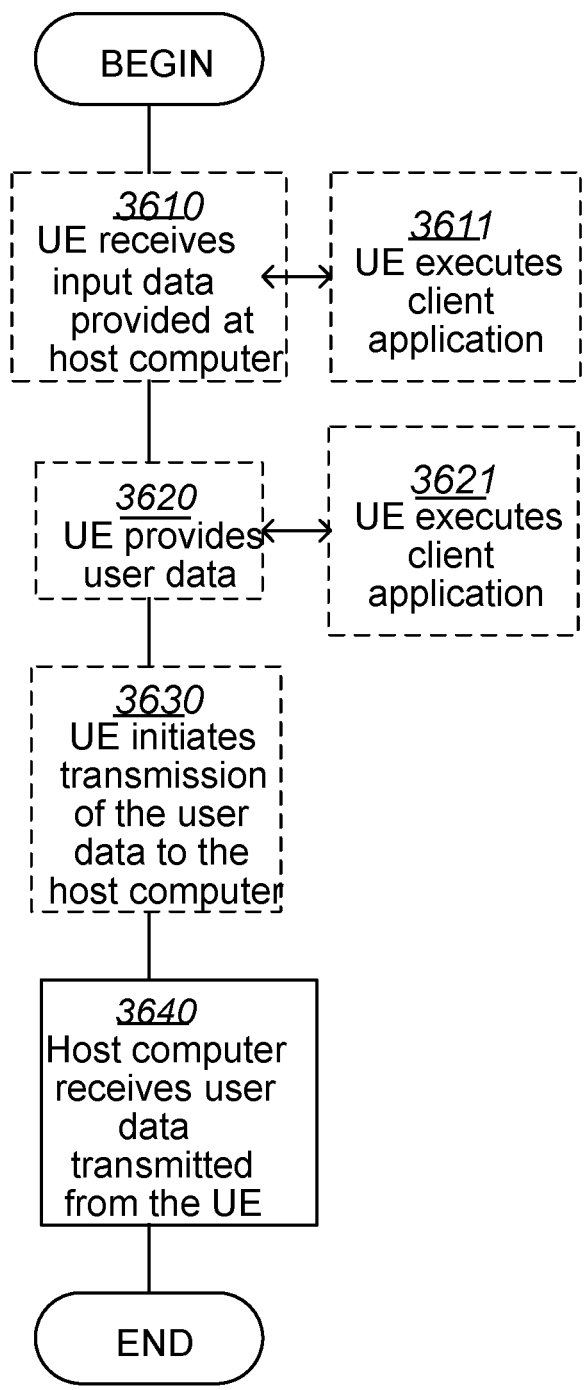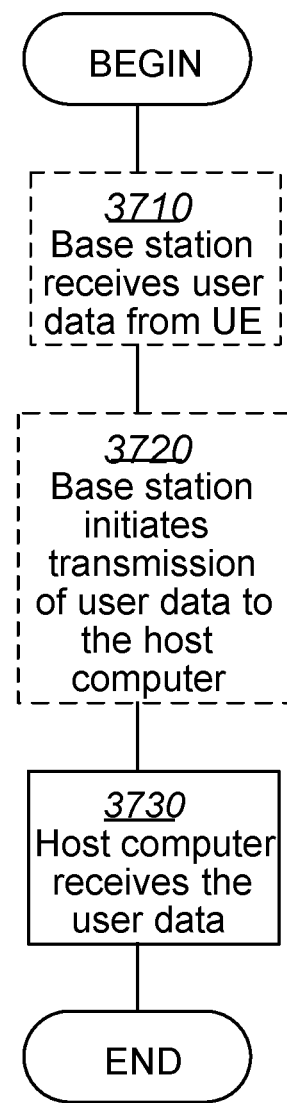
FIG 22
FIG 23

RADIO NETWORK NODE, CORE NETWORK NODE AND METHODS IN A WIRELESS COMMUNICATIONS NETWORK

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

5G RAN Architecture

The current 5G RAN (NG-RAN) architecture is depicted and described in TS 38.401v15.5.0 (http://www.3gpp.org/ftp//Specs/archive/38_series/38.401/38401-f50.zip) as follows. See FIG. 1 depicting an Overall architecture of NG-RAN.

The Next Generation (NG) also referred to as New Generation, architecture may be further described as follows:
The NG-RAN comprises a set of gNBs connected to the 5GC through the NG.
A gNB may support FDD mode, TDD mode or dual mode operation.
gNBs may be interconnected through the Xn.
A gNB may comprise a gNB-Central Unit (CU) and gNB-Distributed Units (DUs). A gNB-CU and a gNB-DU is connected via F1 logical interface.
One gNB-DU is connected to only one gNB-CU.
NOTE: For resiliency, a gNB-DU may be connected to multiple gNB-CU by appropriate implementation.

NG, Xn and F1 are logical interfaces. The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport, signaling transport. If security protection for control plane and user plane data on TNL of NG-RAN interfaces has to be supported, NDS/IP according to 3GPP TS 33.401 [x] shall be applied.

A gNB may also be connected to an LTE eNB via the X2 interface. Another architectural option is where an LTE eNB connected to the Evolved Packet Core network is connected over the X2 interface with a so called en-gNB. The latter is a gNB not connected directly to a CN and connected via X2 to an eNB for the sole purpose of performing dual connectivity.

The architecture in FIG. 1 may be expanded by spitting the gNB-CU into two entities. So, in the split architecture option, the RAN protocol stack functionality is separated in different parts. The CU-CP is expected to handle the RRC layer, the CU-UP will handle the PDCP layer and the DU will handle the Radio Link Control (RLC), Medium Access Control (MAC) and Physical (PHY) layer of the protocol stack. In some further split the DU can have separated unit that handles the PHY parts separately compared to RLC and MAC layers that are handled in a DU. See FIG. 2.

As different units handle different protocol stack functionalities, there will be a need for inter-node communication between the DU, the CU-User Plane (UP) (Packet Data Convergence Protocol (PDCP)) and the CU-Control Plane (CP) (Radio Resource Control (RRC)). This is achieved via F1-C interface related to control plane signaling, via F1-U interface related to user plane signaling for communication between CU and DU and via E1 for communication between CU-UP and CU-CP.

The E1 interface is a logical interface. It supports the exchange of signaling information between the endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

E-UTRAN Split Architecture

The split RAN architecture described above for the NG RAN is also replicated in E-UTRAN. In E-UTRAN a similar node structure than in the NG RAN can be encountered, namely the E-UTRAN is split into an eNB-DU and an eNB-CU, where the eNB-DU hosts the RLC/MAC/PHY protocols and where the gNB-CU hosts the PDCP and RRC protocols.

A split eNB connects to other RAN nodes via the X2 interface and with the EPC CN system via the S1 interface.

FIG. 3 shows the split E-UTRAN architecture so far defined in 3GPP.

Slicing in LTE/EPC

"Slicing" is a central concept in 5G with new mechanisms introduced in the 5GC. But also with EPC, "slicing" is possible. "Slicing" may refer to many concepts, in this document, it refers to the ability to minimize impact between groups of users, that are sharing a pool of resources (radio resources), by using policies for how much resources can be consumed by each group of users in overload situations.

Radio resource management policies for groups of users. Example use cases:
  Limit the amount of resources consumed by inbound roamers in a congested cell.
  Control how large % of resources for public safety users vs consumer MBB Slicing support in RAN is possible for LTE/EPC, using one or a combination of the following identifiers:
  PLMN-id (typically "network sharing")
  QCIs
  Subscribers Profile ID for RAT/Frequency Priority—SPID (e.g. inbound roamers get assigned a certain SPID)
  DCN-id (e.g. users belonging to the public safety dedicated core network shall be treated according to a certain radio resource mgmnt policy)
  Membership of a Closed Subscriber Group (CSG)

In LTE, all identifiers and information received from the CN is available to the eNB, and can be used for resource management between groups of users (aka "slicing").

Network Slicing in NG-RAN

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.

A network slice comprises a RAN part and a CN part. The support of network slicing relies on the principle that traffic for different slices is handled by different PDU sessions, or in other words by different bearers between the RAN and the CN. The network may realise the different network slices by scheduling and also by providing different Layer 1 (L1)/Layer 2 (L2) configurations.

A PDU Session creation between the RAN and the CN results into the creation of a Dedicated Radio Bearer (DRB). The DRB is a communication channel established within the RAN and between the RAN and the UE to transfer user plane data to and from a UE. PDU Sessions and DRBs are assigned a network slice identifier named Single Network Slice Selection Assistance Information (S-NSSAI).

When the CN and RAN engage in signaling to create a UE context at the RAN, the CN may provide to the RAN the Index to RAT/Frequency Selection Priority, which is defined as below in 3GPP TS 38.413:

Index to RAT/Frequency Selection Priority

This Information Element (IE) is used to define local configuration for Radio Resource Management (RRM) strategies such as camp priorities in Idle mode and control of inter-RAT/inter-frequency handover in Active mode, see 3GPP TS 23.501.

| IE/Group Name | Presence | Range | IE type and reference | Semantics description |
| --- | --- | --- | --- | --- |
| Index to RAT/Frequency Selection Priority | M | | INTEGER (1 ... 256, ...) | |

This index may be derived by the CN also on the basis of the Network Slices the UE can access in the registration area where the UE is camping.

Key Issue on 5GC Assisted Cell Selection to Access Network Slice

A 3GPP SA WG2 discussed a proposal "Key Issue on 5GC assisted cell selection to access network slice" S2-2001467, "Key Issue on 5GC assisted cell selection to access network slice", to study solutions enabling support for dedicated frequencies per network slice, claiming it would satisfy the GSMA PRD NG.116 requirements in GSMA PRD NG.116 v2.0: "Generic Network Slice Template, Version 2.0, 16 Oct. 2019" allowing network slices being defined to use only certain frequencies (radio spectrum).

The assumptions from S2-2001467, "Key Issue on 5GC assisted cell selection to access network slice", is that the coverage of the frequencies may be like the cell coverage per frequency band depicted in FIG. 4.

The assumption in S2-2001467, "Key Issue on 5GC assisted cell selection to access network slice" is further as shown in FIG. 5 that the UE would be rejected if the S-NSSAI (Network Slice) that the UE request is not defined for the cell which the UE is using. FIG. 5 depicts a sequence diagram where a UE is rejected based on UE's current cell/frequency band is not defined for Network Slices the UE is requesting.

Action 5-1, 5-2, 5-3, and 5-4 relates to an NG Setup, clause 8.7.1 of 3GPP TS 38.413.
  Action 5-1: Supported S-NSSAI per TA: S-NSSAI #1.
  Action 5-2: AMF stores supported S-NSSAI by RAN 1.
  Action 5-3: Supported S-NSSAI per TA: S-NSSAI #2.
  Action 5-4: AMF stores supported S-NSSAI by RAN 2.
  Action 5-5: Registration Request, requested NSSAI: S-NSSAI #2.
  Action 5-6: Registration Request, requested NSSAI: S-NSSAI #2.
  Action 5-7: AMF determines Allowed NSSAI and rejected S-NSSAI. AMF cannot allow S-NSSAI #2 as S-NSSAI #2 is not supported by RAN 1.
    A.NSSAI: default S-NSSAI.
    Rejected S-NSSAI: S-NSSAI #2.
  Action 5-8: RFSP is determined based on A.S-NSSAI, i.e. default S-NSSAI in this case.
  Action 5-9: N2 message, Allowed S-NSSAI: default S-NSSAI, rejected S-NSSAI: S-NSSAI #2, RFSP index.
  Action 5-10: Registration Accept, Allowed S-NSSAI: default S-NSSAI, rejected S-NSSAI: S-NSSAI #2.

SUMMARY

As a part of developing embodiments herein the inventors identified a problem which first will be discussed.

The current standard does not fully support steering the frequency bands and/or cells to use for a UE based on what Network Slices the UE requests to use when some Network Slices require dedicated spectrum (frequency bands) to be used.

As stated in S2-2001467, "Key Issue on 5GC assisted cell selection to access network slice":
  "Observation 4: The current mechanism to set the Index to RAT/Frequency Selection Priority (RFSP) is based on Allowed Network Slice Selection Assistance Information (NSSAI). Therefore, using RFSP as it is does not resolve the issue. For example, in case #1, the RFSP is based on default S-NSSAI, so the UE will not select RAN node 2 by using RFSP."

An object of embodiments herein may therefore to improve the handling of network slicing in a wireless communications network.

According to an aspect of embodiments herein, the object is achieved by a method performed by a Radio Access Network, RAN, node for handling a service request from a User Equipment, UE, in a wireless communications network: The RAN node supports a first network slice in a first Area, A1, The RAN node connects to the UE via A1. The RAN node sends to a Core Network, CN, node, a service request from the UE. The service request relates to one or more network slices that the UE requests in a certain Area. The RAN node receives an indication from the CN node. The indication indicates the one or more network slices requested by the UE together with any one or more out of:
—A list of network slices that are allowed to be accessed by the UE in the current A1, and—an indication of a new area priority policy associated to the one or more network slices that are requested by the UE. The RAN node decides how to handle the service request from the UE based on the indication received from the CN node.

According to another aspect of embodiments herein, the object is achieved by a method performed by a Core Network, CN, node for handling a service request from a User Equipment, UE, in a wireless communications network.

The CN node provides information to a Radio Access Network, RAN, node. The information is that the RAN node supports the first network slice in A1, The CN node receives a message from the RAN node, which message, indicates one or more network slices that the UE has requested in the certain Area, The CN node sends an indication to the RAN node. The indication indicates the one or more network slices requested by the UE together with any one or more out of:
  a list of network slices that are allowed to be accessed by the UE in the current first area A1, and
  an indication of a new area priority policy associated to the one or more network slices that are requested by the UE.

According to another aspect of embodiments herein, the object is achieved by a Radio Access Network, RAN, node configured to handle an service request from a User Equipment, UE, in a wireless communications network. The RAN node is adapted to support a first network slice in a first Area, A1. The RAN node further being configured to:
  Connect to the UE via A1,
  on behalf of the UE, send 903 to a Core Network, CN, node, a service request from the UE, which service request is adapted to relate to, a network slice that the UE requests in a certain Area,
  receive an indication from the CN node, which indication is adapted to indicate the one or more network slices requested by the UE together with any one or more out of:
    a list of network slices that are allowed to be accessed by the UE in the current first area A1,
    an indication of a new area priority policy associated to the list of network slices that are requested by the UE,
  decide how to handle the service request from the UE based on the indication received from the CN node.

According to another aspect of embodiments herein, the object is achieved by a Core Network, CN, node, configured to handle a service request from a User Equipment, UE, in a wireless communications network. The CN node further being configured to:
  Provide to a Radio Access Network, RAN, node, information that the RAN node supports the first network slice in A1,
  receive a message from the RAN node, which message is adapted to indicate a network slice that the UE has requested in a certain Area,
  send an indication the RAN node, which indication is adapted to indicate the one or more network slices requested by the UE together with any one or more out of:
    a list of network slices that are allowed to be accessed by the UE in the current first area A1,
    an indication of a new area priority policy associated to the one or more network slices that are requested by the UE.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored there on a computer program product comprising instructions which, when executed on at least one processor, cause the at least one processor to carry out the method according to any of the methods above, as performed by the RAN node or the CN node.

Since the RAN node decides how to handle the service request from the UE based on the indication received from the CN node network slices are enabled to use dedicated radio spectrum. Further full network control is allowed and steering of the used frequency bands in relation to the Network Slices the UE wants to use without adding new system information in cell broadcast or complex configuration of the UE is provided.

This results in an improved handling of network slicing in the wireless communications network.

BRIEF DESCRIPTION OF THE DRAWINGS

Examples of embodiments herein are described in more detail with reference to attached drawings in which.

FIGS. 20-23 are flowcharts illustrating methods implemented in a communication system including a host computer, a base station and a user equipment.

DETAILED DESCRIPTION

Example embodiments herein e.g. provide slice specific RRM control.

Embodiments described herein take as a reference the 5G system, i.e. the 5G Core connected to the NG-RAN. However, the person skilled in the art may deduce that the methods apply also to the case where other systems supporting network slicing are adopted, e.g. the EPS.

Figure 1:
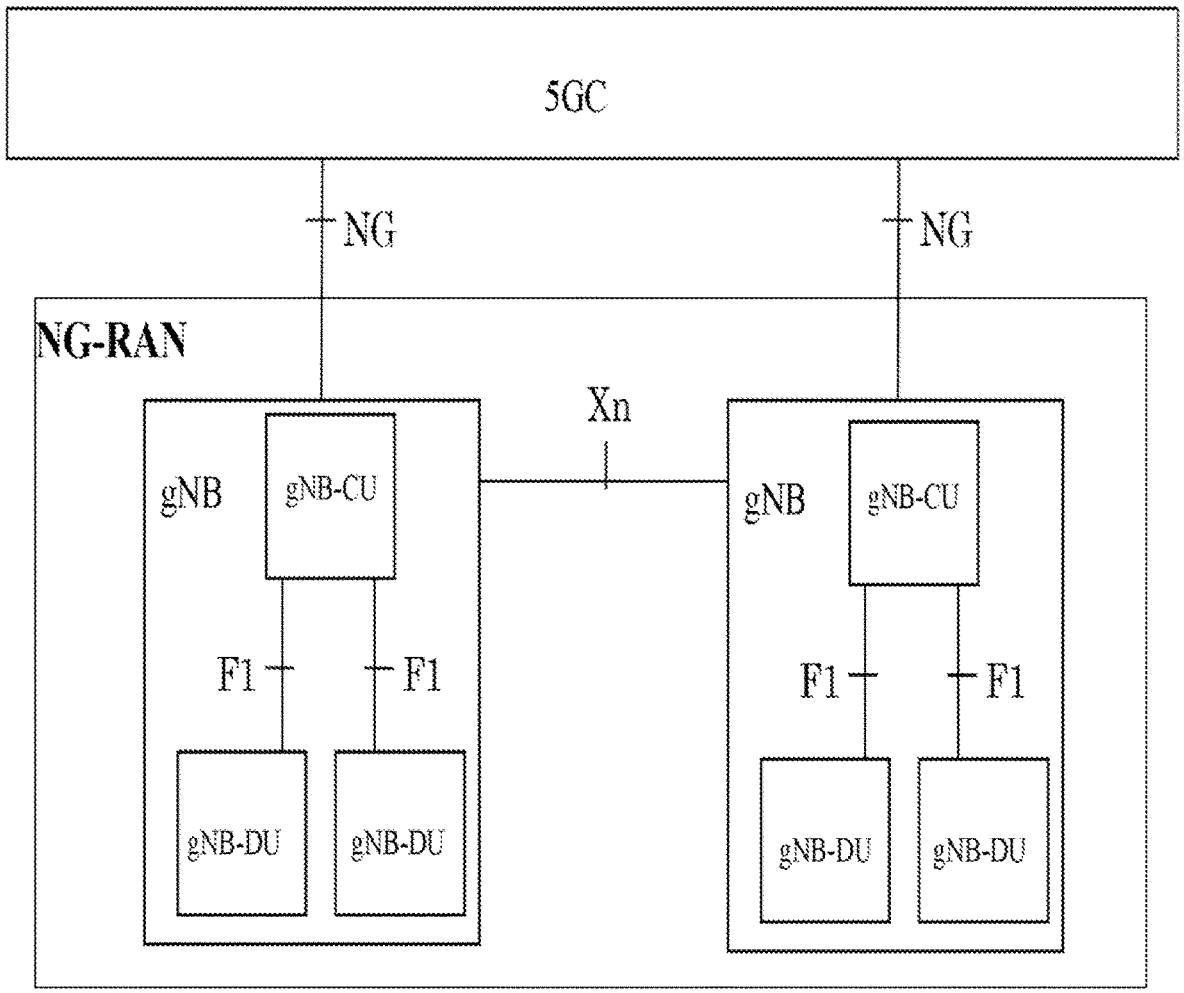
FIG. 1 is a schematic block diagram illustrating prior art.
Figure 2:
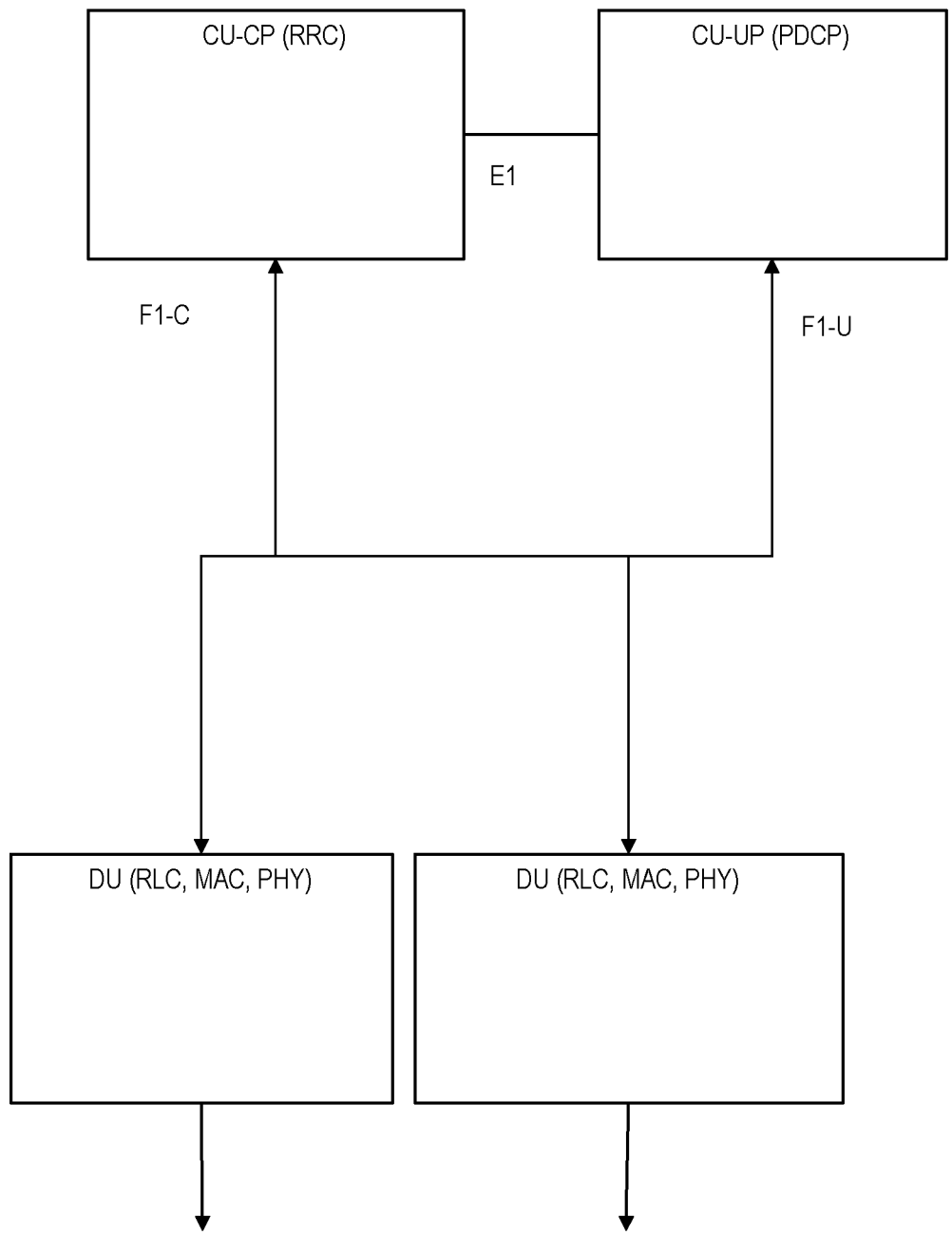
FIG. 2 is a schematic block diagram illustrating prior art.
Figure 3:
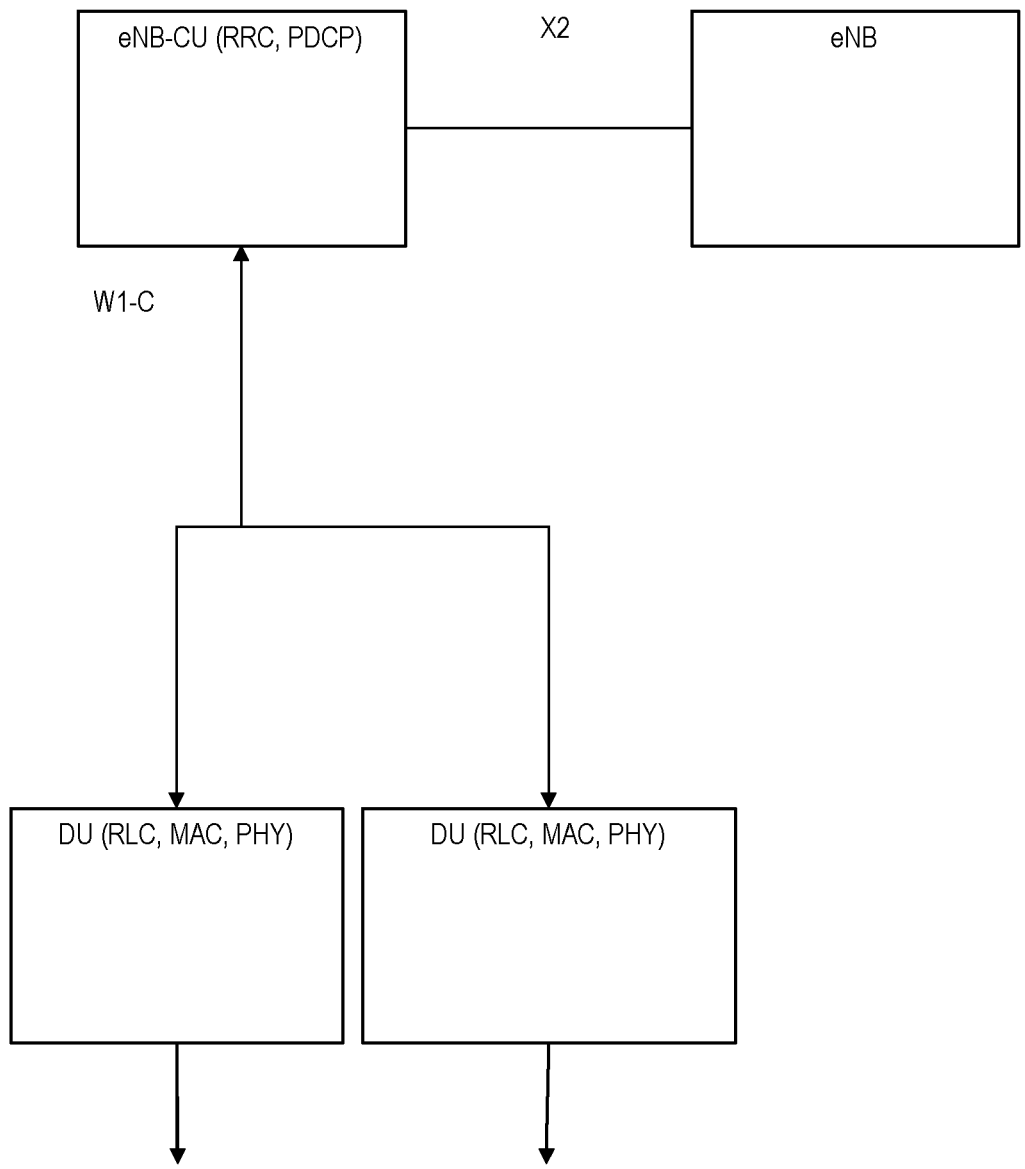
FIG. 3 is a schematic block diagram illustrating prior art.
Figure 4:
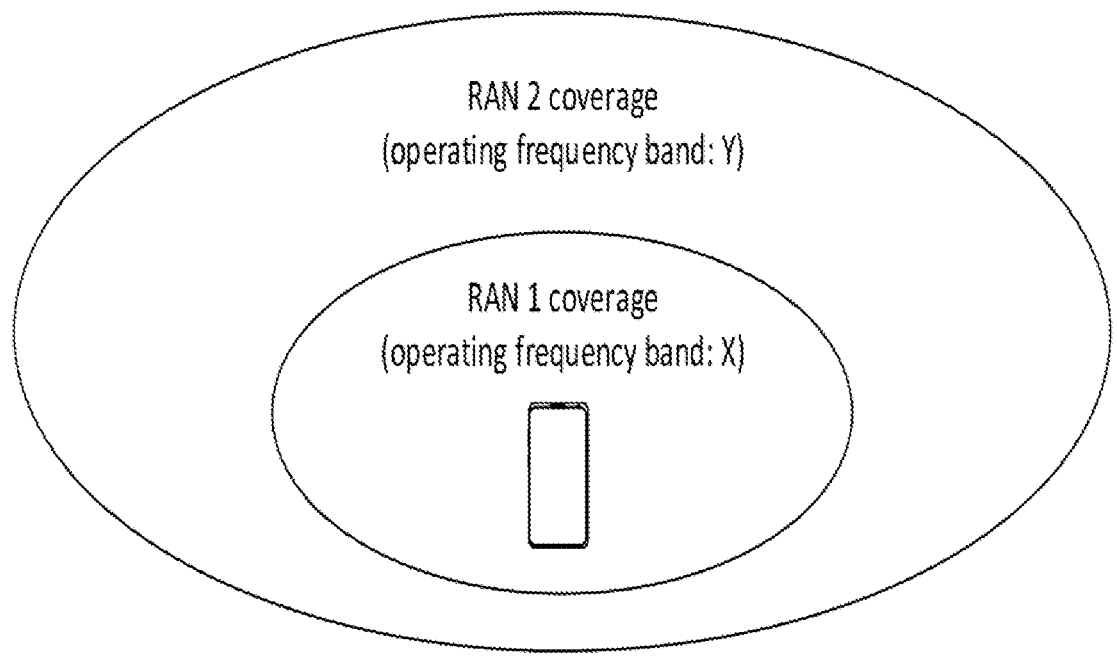
FIG. 4 is a schematic block diagram illustrating prior art.
Figure 5:
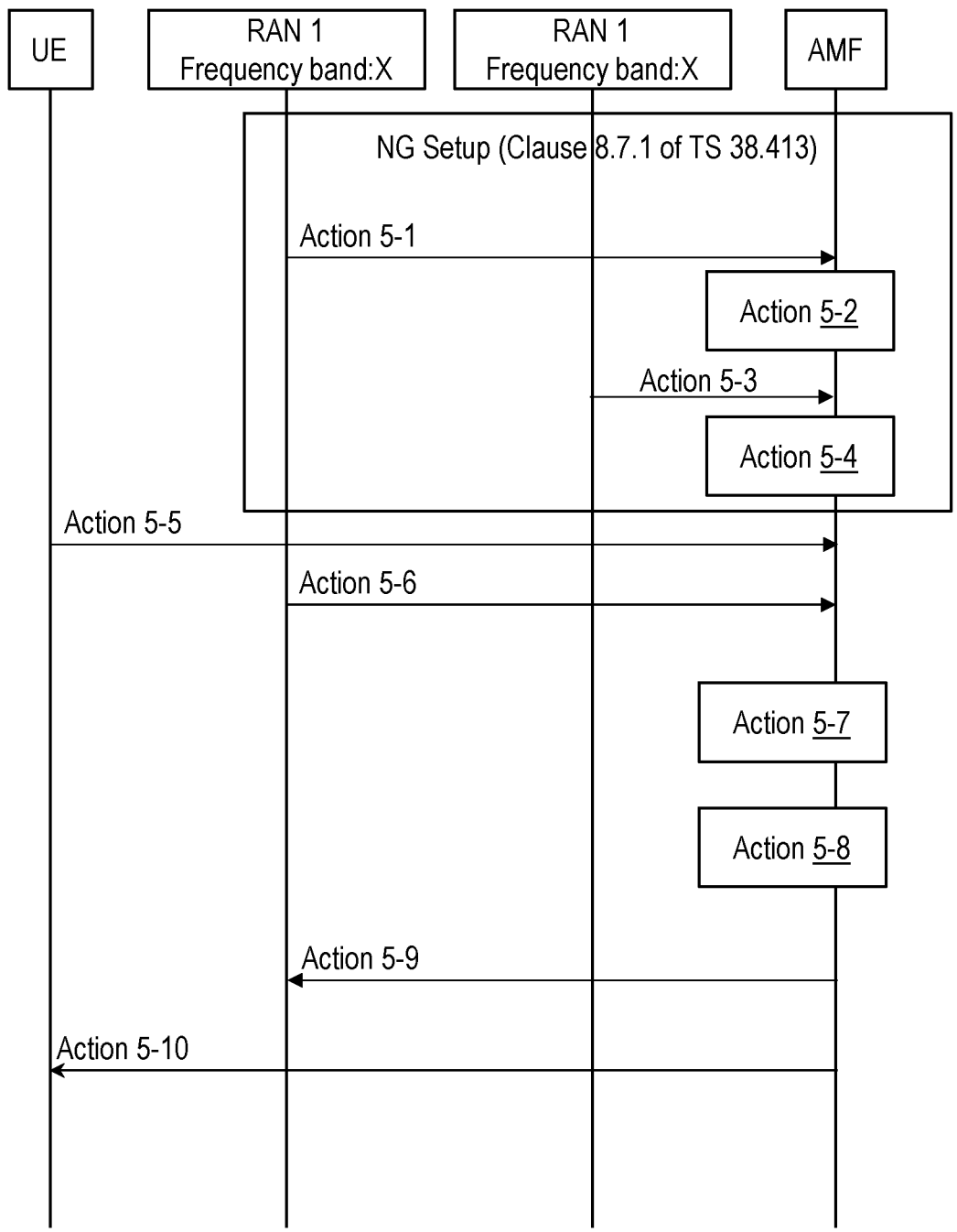
FIG. 5 is a sequence diagram illustrating prior art.
Figure 6:
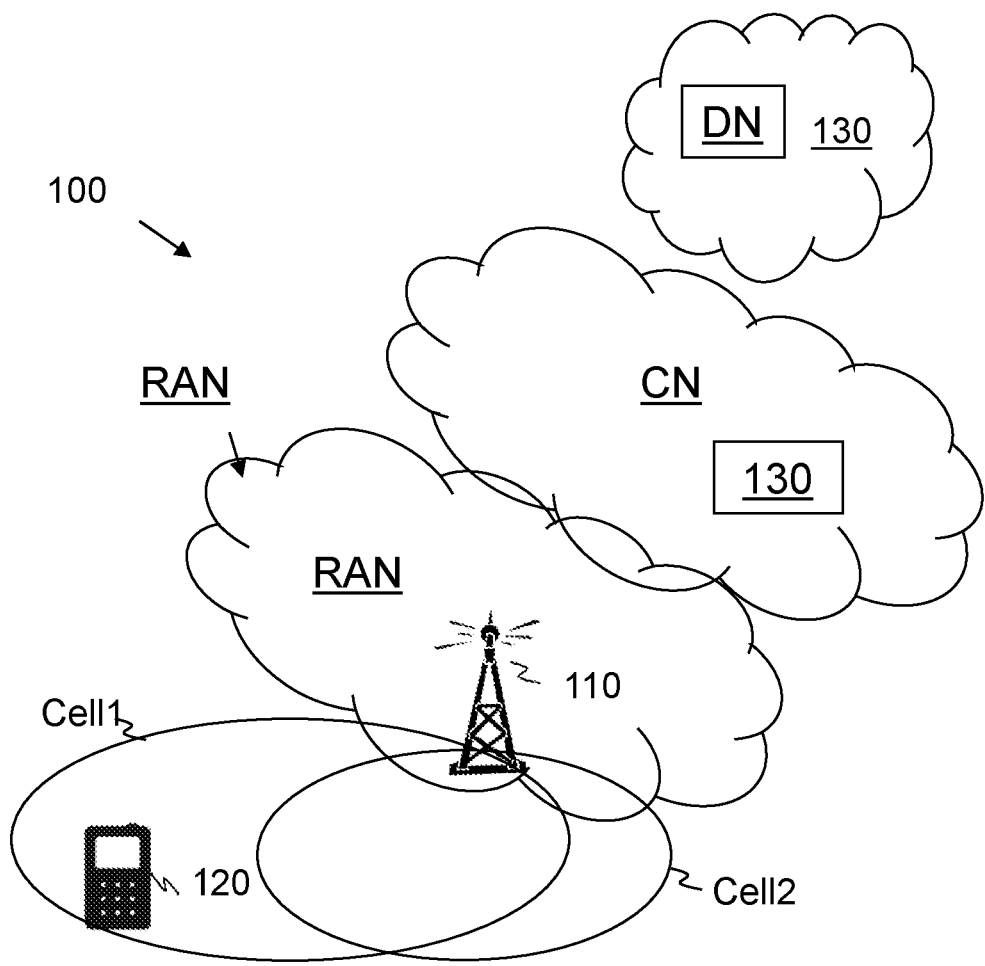
FIG. 6 is a schematic block diagram illustrating embodiments of a wireless communications network.

FIG. 6 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a RAN node 110 operate in the wireless communications network 100, providing radio coverage by means of antenna beams, referred to as beams herein. The RAN node 110 may also be referred to as a RN node 110. The RAN node 110 e.g. provides a number of cells referred to as cell1 and cell2 and may use these cells for communicating with e.g. a UE 120. The RAN node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the RAN node 110 depending e.g. on the radio access technology and terminology used.

User Equipments operate in the wireless communications network 100, such as a UE 120. The UE 120 may provide radio coverage by means of a number of antenna beams 127, also referred to as beams herein.

The UE 120 may e.g. be an NR device, a mobile station, a wireless terminal, an NB-IoT device, an eMTC device, a CAT-M device, a WFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes such as a CN node 130 operates in the wireless communications network 100. The CN node may e.g. be an AMF node or an SMF node.

In some embodiments, the CN node 130 relates to an Operation, Administration and Maintenance (OAM) node.

Methods herein may in one aspect be performed by the RAN node 110, and in another aspect by the CN node 130. As an alternative, a Distributed Node (DN) and functionality, e.g. comprised in a cloud 140 as shown in FIG. 6, may be used for performing or partly performing the methods.

The CN node 130 may e.g. be a 5GC/AMF. The RAN node 110, may e.g. be an NG-RAN.

The following example embodiments may be provided. Options to Control Both CP and UP Usage:

A. The CN node 130 provides the RAN node 110, with an indication such as an identifier able to point at a network slice that the UE 120 wants to use in a certain Registration Area (RA) but that is not available in that RA.

The identifier able to point at a network slice may e.g. be the S-NSSAIs that the UE 120 wants to use, namely the S-NSSAIs that the UE 120 has requested in a certain Registration Area (RA), but that is not available in that RA.

This is a new piece of information signaled from CN to RAN, such as from the CN node 130 to the RAN node 110.

a). Based on knowledge of the S-NSSAIs to frequencies mapping, namely based on knowledge of the cells and frequency where the UE-requested S-NSSAIs are supported, NG-RAN, such as the RAN node 110, may decide how to handle the service request from the UE 120 based on the indication received from the CN node 130, such as e.g.:

i. Perform network controlled mobility of the UE 120 to the appropriate frequency, e.g. using Release with Redirect procedure, see 3GPP TS 38.331v15.8.0.

ii. Provide cell Reselection Priorities (CellReselectionPriorities) to the UE 120.

B. RFSP, or the SPID in case of EPS, (existing IE or new) provided by CN such as the CN node 130, to NG-RAN such as the RAN node 110 is adapted to be based on what S-NSSAIs that the UE 120 wants to use. Namely, the RFSP provided by CN to RAN such as from the CN node 130 to the RAN node 110, is adapted to point at a frequency priority that would steer the UE 120 towards the frequencies where the requested S-NSSAIs are served.

C. Additional information may be provided to the RAN such as the RN node 110, besides the existing e.g. RFSP as today and Allowed NSSAI (according to what was allowed or as per default subscribed S-NSSAIs).

a. the CN node 130 e.g. AMF may in addition provide Rejected S-NSSAIs for RA (or new cause) and an additional RFSP to RAN such as the RN node 110 (i.e. the RFSP that would be used in case the S-NSSAIs part of the rejected S-NSSAIs were to be used). Or the S-NSSAIs requested by the UE 120, excluding e.g. not allowed S-NSSAIs for the UE 120, may be provided in a new S-NSSAI list to the RAN.

b. RAN such as the RN node 110 may use the additional RFSP to provide "additional" cellReselectionPriorities to the UE (for the rejected S-NSSAIs)

c. Upon a release of the UE 120 from the RAN, such as the RN node 110, and upon appropriate RRC configuration from the RAN such as the RN node 110 to the UE 120 with the RAT/Frequency priority derived from the information signaled to RAN such as the RN node 110 by the CN such as the CN node 130, the UE 120 either uses what was accepted, or use additional info to select another coverage layer and issues a new NAS Registration request (e.g. Without GUAMI) from the newly selected RAN to an appropriately selected CN node 130 such as e.g. an AMF/SMF.

D. The 5GC/AMF such as the CN node 130 learns which TAIs are overlapping with the TAI of the cell the UE 120 is using any one r more out of:
  a. In Initial UE message (or during NGAP SETUP), NG-RAN such as the RN node includes "overlapping TAIs" per TAI per cell,
  b. When the UE 120 tries to Register and the Requested NSSAI cannot be served by current TAI/RA, the CN node 130 e.g. the AMF checks overlapping TAIs and if a TAI can serve the Requested NSSAI, the AMF forwards that or both options to NSSF for slice selection.
  c. A CN node 130 such as an NSSF replies back with Allowed NSSAI for one or both cases.
  d. The CN node 130 e.g. the AMF creates NAS message according to best option for user (TBD if multiple options e.g. Slice priority etc) and Initial Context Setup includes NAS message, and info to RAN such as the RN node to steer to overlapping TAI (using RFSP or new indication).

Option to control UP usage:
A. Dedicated frequency bands control is enabled when activating the User Plane i.e.
  a. NAS Registration and Requested S-NSSAIs from the UE 120 are accepted by the 5GC such as the CN node 130, even if the cell where the UE 120 is connecting does not support the requested S-NSSAIs at UP level. The RAN such as the RN node 110 may however accept a request from the 5GC, such as the CN node 130, to allocate PDU Session resources for one or more bearers assigned to the requested S-NSSAIs. When UP is activated the UE 120 is steered away, via mobility procedures, to appropriate frequency band and cell that supports the requested S-NSSAIs at UP level.

Advantages of Embodiments Herein

Embodiments herein enable network slices to use dedicated radio spectrum. Full network control is allowed and steering of the used frequency bands in relation to the Network Slices the UE 120 wants to use without adding new system information in cell broadcast or complex configuration of the UE is provided.

Figure 7:
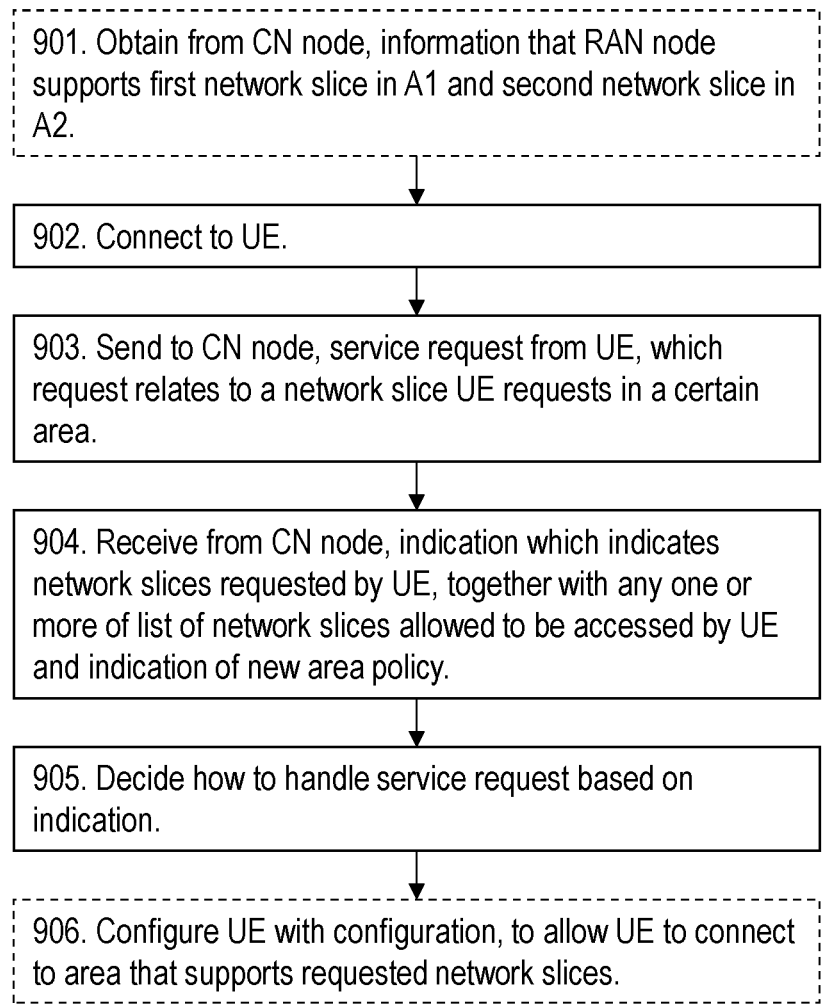
FIG. 7 is a flowchart depicting embodiments of a method in a RAN node.

FIG. 7 shows an example method performed by the RAN node 110, e.g. for handling a service request from the UE 120 in the wireless communications network 100. It should be noted that the wording "service request" may be related to any service request such as e.g. Service Request on NAS layer and Registration Requests on NAS layer.

The RAN node 110 supports a first network slice in a first Area (A1) e.g. RA1 TAI1. The RAN node 110 may further support a second network slice in a second Area (A2), e.g. RA2, TAI2.

The first network slice in A1 and the second network slice in A2 may be the same slice. This may e.g. be the case for UP usage control where the slice is supported by both first and second RAN, but where there is a policy to prefer second RAN for serving the requested slice.

The method comprises any one or more out of the actions below:

Action 901

The RAN node 110, may obtain information from the CN node 130. This is information is about which network slices and areas that the RAN node 110 supports. E.g. information that the RAN node 110 supports the first network slice in A1, and that the RAN node 110 further supports the second network slice in A2.

Action 902

The RAN node 110 connects to the UE 120 via A1. A1 may e.g. be cell1. This may be performed by receiving a service request from the UE 120. The request may e.g. comprise information about or indicate a network slice that the UE 120 requests in a certain Area, e.g. RA, TA. The Area, such as e.g. the certain area, A1, and A2, may be constituted by a Registration Area and/or a Tracking Area and/or a cell and/or a frequency.

It should be noted that the service request is an example and it may as well be a registration request.

It should further be noted that the requested network slice may comprise one or more network slices. Thus, the wordings "the network slice" and "the one or more network slices" may be used interchangeably herein.

Action 903

The RAN node 110 sends to the CN node 130, the service request from the UE 120. This may be performed by forwarding the service request from the UE 120 to the CN node 130, e.g. being an AMF. It may e.g. be sent on behalf of the UE 120.

The service request may either be transparent to the RAN node 110 or it may be visible to the RAN node 110. The service request relates to, e.g. indicates, one or more network slices that the UE 120 requests in a certain Area, e.g. RA, and/or TA. This slice may not be supported in A1 and is e.g. a slice such as the one or more slices supported in A2. It should be noted that such slice may be the same as the slice supported in the first area. The service request may e.g. be obtained by the UE 120 default behavior or received in the request in the message. The RAN node 110 may forwards the service request or registration request to the CN node 130 "on behalf of" the UE 120. The RAN node 110 may not have visibility of what is inside the message that performs registration/service request.

In some embodiments, the UE 120 requests one or more S-NSSAIs, and at least one S-NSSAI that the UE 120 requests is not supported in A1 whereby the CN node 130 will provide the RAN node 110 with a set of S-NSSAIs including those the UE 120 requests that were not available in A1, i.e. rejected for the current registration Area, to the RAN node 110, and optionally an RFSP.

In some embodiments, the receiving the indication from the CN node 130 further comprises: Receiving from the CN node 130, an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

Action 904

The RAN node 110 receives an indication from the CN node 130. It should be noted that the new area priority policy part of the indication may be received from the CN node 130 via an Operation, Administration and Maintenance (OAM) node. While the list of network slices that are allowed to be accessed by the UE provided by another CN node 130 such as the AMF. It should be noted that the action that may be performed via the OAM is only that of providing to the RAN a resource priority policy, namely, a policy according to which the RAN knows on which resources, e.g. frequencies, to serve certain slices.

The indication indicates the one or more network slices requested by the UE 120 together with any one or more out of:
- a list of network slices that are allowed to be accessed by the UE in the current first area A1, and
- an indication of a new area priority policy, e.g. in the form of an Index to RAT/Frequency Selection Priority information element, associated to the one or more network slices, e.g. the list of network slices, that are requested by the UE 120. The new area priority policy may be an RFSP and/or an SPID.

The indication received from the CN node 130 may in some embodiments, e.g. comprise any one out of: An RFSP, or a SPID, a list of S-NSSAIs, or an RFSP, or a SPID, and list of S-NSSAIs.

The indication received from the CN node 130 may in some other embodiments, enable the RAN node 110 to derive any one out of: An RFSP or a SPID, a list of S-NSSAIs, or an RFSP, or a SPID, and list of S-NSSAIs.

Action 905

The RAN node 110 then decides how to handle the service request from the UE 120 based on the indication received from the CN node 130.

By means of the list of network slices that are allowed to be accessed by the UE 120 in the current first area A1, and the indication of a new area priority policy, the RAN node 110 is enabled to decide how to handle the service request. This is possible since the RAN node 110 is aware of the slices requested by the UE 120 and allowed in the area, as well as the resource policy assigned to serve such slices, according to which the slice should be served on specific radio resources, e.g. specific frequencies. The RAN node 110 may also be aware of what specific radio resources, e.g. specific frequencies are available, and when the specific radio resources are available corresponding to the resource policy set for the network slices requested by the UE 120, the RAN node 110 decides to use those specific radio resources for the UE 120.

This is an advantage since it may be requested that certain slices are only served on specific radio resources to improve their efficiency, reliability, service quality, resilience to failures and more.

In some embodiments, the deciding how to handle the service request from the UE 120 based on the indication received from the CN node 130 comprises deciding to perform UE 120 mobility, e.g. release, redirection or handover, to the area where the network slices requested by the UE are supported.

In some embodiments, the deciding how to handle the service request from the UE 120 based on the indication received from the CN node 130 comprises, e.g. is performed based on, comparing the received list of Allowed network slices and the list of requested network slices with the network slices supported in the area where the UE 120 is currently served.

In these embodiments, based on a result of the comparison between the received list of Allowed and requested network slices and the network slices supported in the area where the UE 120 is currently served, the RAN node 110 decides whether to move the UE 120 connection, e.g. via handover or release or redirection, to a different area where the requested network slices are supported.

The service request may be a request such as a Service request on NAS layer as per 3GPP TS 24.501, by the UE 120 to activate User Plane for one or more PDU Sessions, each one associated to a network slice, or the service request may be a Registration request, such as a Registration on NAS layer as per 3GPP TS 24.501, in which the UE 120 requests to change the registered network slices, S-NSSAIs, i.e. UE 120 request S-NSSAIs to be registered in the Requested NSSAI and the registered S-NSSAIs are received in the Allowed NSSA as part of the Registration Accept sent by the AMF. The network slices requested by the UE 120 may be the S-NSSAIs sent by the UE 120 to the AMF, or it may be a list of S-NSSAIs requested by the UE 120 excluding the S-NSSAIs that are allowed to be accessed by the UE 120 in the current A1, and then received e.g. as rejected S-NSSAIs for the current area A1 or as part of a new list.

Action 906

In some embodiments, the RAN node 110 configures the UE 120 with a new RAT and/or frequency priority configuration in order to allow the UE 120 to connect to the area that supports the requested network slices.

Figure 8:
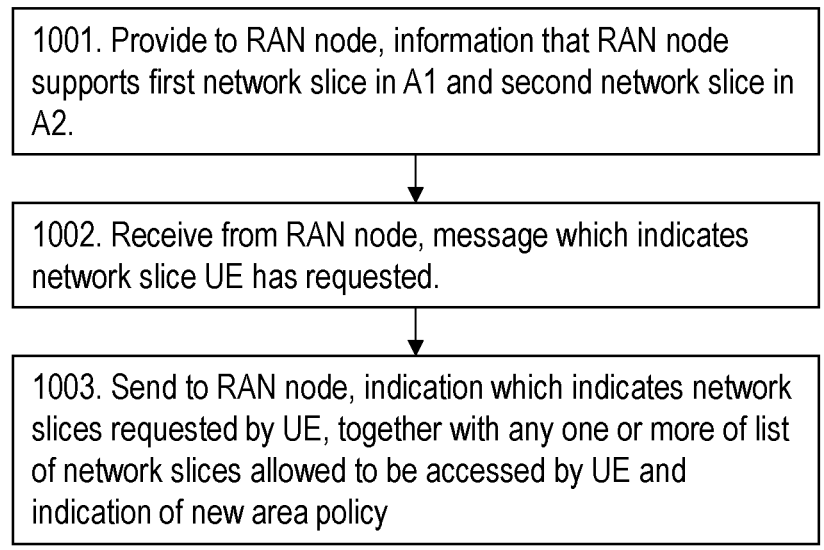
FIG. 8 is a flowchart depicting embodiments of a method in a CN node.

FIG. 8 shows an example of a method performed by the CN node 130, e.g. for handling a service request from the UE 120 in the wireless communications network 100. The CN node 130 may e.g. be an AMF node.

The method may comprise any one or more of the actions below.

Action 1001

The CN node 130 may provide information to RAN node 110. This is information is about which network slices and areas that the RAN node 110 supports. The information is e.g. that that RAN node 110 supports the first network slice in A1, and that the RAN node 110 further supports the second network slice in A2.

Action 1002

The CN node 130 receives a message from the RAN node 110. The message indicates a network slice that the UE 120 has requested in the certain Area.

Action 1003

The CN node 130 sends an indication the RA node 110. The indication indicates the one or more network slices requested by the UE together with any one or more out of:
- a list of network slices that are allowed to be accessed by the UE in the current first area A1,
- an indication of a new area priority policy, e.g. in the form of an Index to RAT/Frequency Selection Priority information element, associated to the list of network slices that are requested by the UE 120.

It should be noted that the new area priority policy part of the indication may be sent from the CN node 130 via an Operation, Administration and Maintenance (OAM) node. While the list of network slices that are allowed to be accessed by the UE 120 provided by another CN node 130 such as the AMF.

The sending of the indication the RA node 110 may further comprise that the CN node 130 sends an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

The Area, e.g. certain area A1, A2, may be constituted by a Registration Area and/or a Tracking Area and/or a cell and/or a frequency.

The sent indication may in some embodiments, e.g. comprise any one out of: An RFSP, or a SPID, a list of S-NSSAIs, or an RFSP, or a SPID, and list of S-NSSAIs. The sent indication may in some other embodiments, enable the RAN node 110 to derive any one out of: An RFSP or a SPID, a list of S-NSSAIs, or an RFSP, or a SPID, and list of S-NSSAIs.

The method will now be further explained and exemplified in below embodiments. These below embodiments may be combined with any suitable embodiment as described above.

The RAN mentioned in the below examples may be represented by the RAN node 110, and the 5GC mentioned in the below examples may be represented by the CN node 130.

In the examples in the Figures as described below, the UE 120 is referred to as UE, the RAN node 110 is referred to as gNB and the CN node 130 is referred to as AMF. The AMF may instead be an SMF. Further, the wording network slice is referred to as S-NSSAI.

In FIGS. 9-13 described below, the RAN node 110 is referred to as gNB1 110, and the CN node 130 is referred to as AMF 130.

Options to control User Plane (UP) and Control Plane (CP)

Embodiment A

Figure 9:
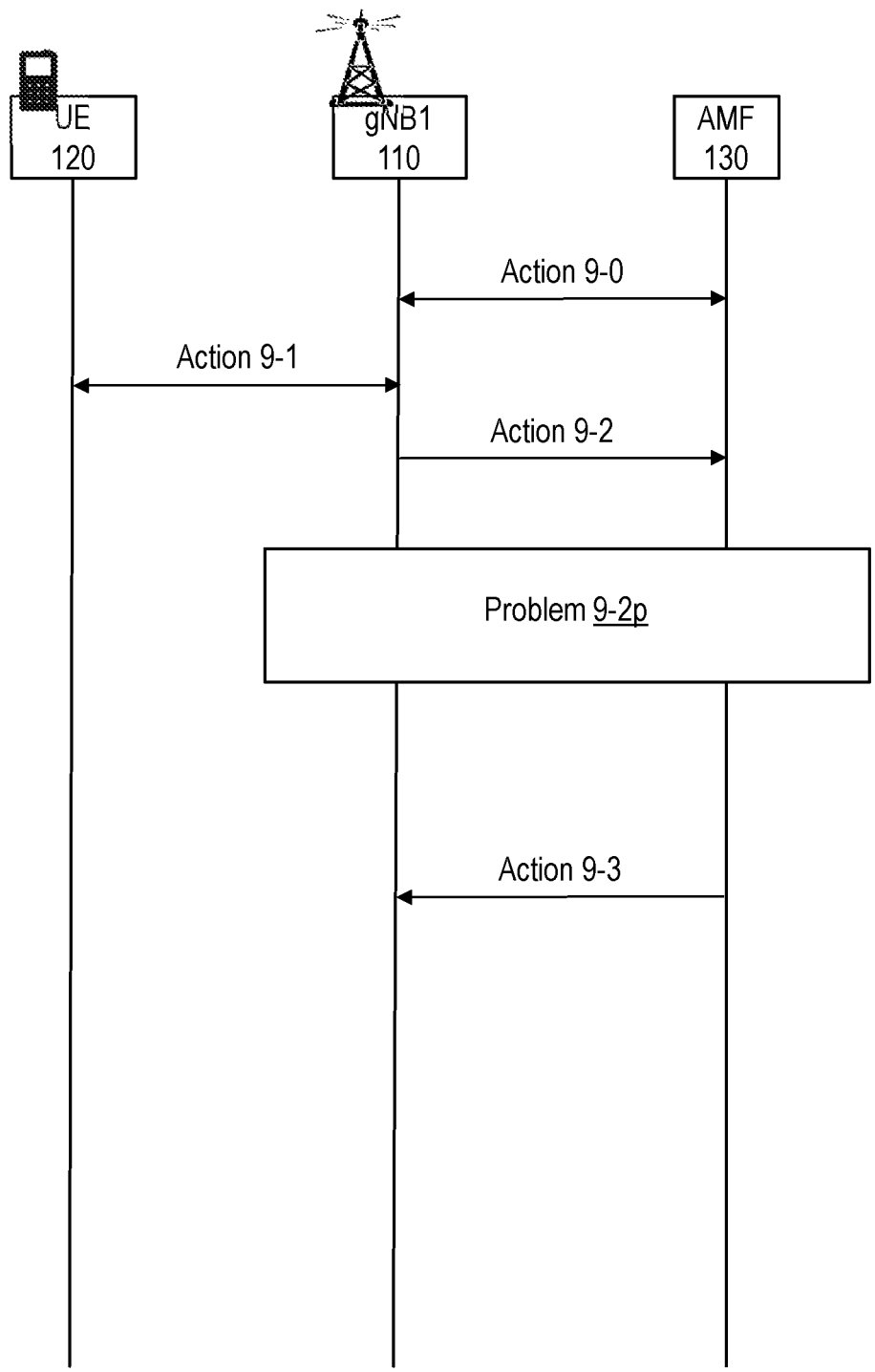
FIG. 9 is a sequence diagram illustrating embodiments of a method.

An example of the realization of embodiment A described above is presented in FIG. 9. FIG. 9 depicts Assistance information from the CN node to the RAN node in the form of Requested NSSAI.

Relating to gNB1:
Cell1 deployed on Frequency 1, supports S-NSSAI1 and TAI1,
Cell2 deployed on Frequency 2, supports S-NSSAI2 and TAI2.

Action 9-0: NG Setup: AMF learns RAN supported S-NSSAIs per TAI; RAN learns AMF supported S-NSSAIs per TAI. (Step 0)

Action 9-1: MSG1 to MSG5: No NSSAI signalled by UE, if default behaviour assumed. (Step1)

Action 9-2: NG: Initial UE Message, including NAS service Request and Requested NSSAI. (Step2)

Problem 9-2p occurs: UE Requests S-NSSAI #2, supported on TAI #2 on Frequency #2, while UE is connected to TAI #1 on Frequency #1, not supporting S-NSSAI #2. At this stage RAN does not know the UE's requested NSSAI. (Step 1)

Action 9-3: NG: Initial Context Setup, includes the Allowed NSSAI for the RA the UE is in; Additionally: it may include the Requested NSSAI received over NAS. (Step 3)

In FIG. 9, the UE 120 connects to the RAN node 110 in Cell1, where Cell1 is deployed on Frequency 1, with TAI1 and it supports a network slice represented by 5-NSSAI1 (Step 1)

When the UE 120 triggers a service request such as a NAS Service request, the RAN node 110 signals it to the CN node 130 via an NG Initial UE Message procedure. The Service Request includes a Requested NSSAI=S-NSSAI2, which is not served by the Cell/TAI the UE 120 is connecting from. Note that the CN node 130 learns from the service Request/Initial UE Message from which TAI the UE 120 is connecting and given that the CN node 130 learns at NG interface setup which S-NSSAIs the RAN such as a the RAN node 110 supports per each supported TAI, the CN node 130 is able to know if the UE 120 requested NSSAI is served in the current UE 120 location.

In Step 3 the CN node 130 sends, e.g. signals to the RAN node 110, the indication, such as the Requested NSSAI, in addition to the already supported Allowed NSSAI. The Requested NSSAI may be as provided by the UE 120 over NAS, or after check by the CN node 130 e.g. removing any S-NSSAIs that are not subscribed.

This relates to Actions 904 and 1003 described above wherein the indication comprises any one or more out of:
—the list of network slices that are allowed to be accessed by the UE in the current first area A1, and—the indication of a new area priority policy associated to the one or more network slices that are requested by the UE 120.

The following options are in general possible after Step 3: This relates to Action 905 described above.

If Requested NSSAI is supported in currently serving TAI.
   The CN node 130 may trigger an NG PDU Session Resource Setup Request for the Requested NSSAI. The RAN node 110 serves the UE 120 According to PDU Session Resource Setup Request in NG: Initial Context Setup If Requested NSSAI is not supported in currently serving TAI, but it is served in a different TAI
   The RAN node 110 may, if possible, release and redirect the UE 120 to a different Cell/frequency/TAI, where the Requested NSSAI is supported If Requested NSSAI is partially supported in currently serving TAI (with respect to the Figure above, UE 120 requested S-NSSAI1 and S-NSSAI2)
   If the CN node 130 includes the PDU Session Resource Setup Request in NG: Initial Context Setup towards NG-RAN, NG-RAN such as e.g. RAN node 110 shall establish the requested PDU Session Resources for the S-NSSAIs supported in serving TAI and requested by the UE. Other requested S-NSSAIs services would not be served.
   If the CN node 130 does not include the PDU Session Resource Setup Request in NG: Initial Context Setup towards NG-RAN, such as e.g. RAN node 110 shall, if possible, release and redirect the UE 120 to a different Cell/frequency/TAI, where the Requested S-NSSAIs not supported in serving TAI are supported.

Embodiment B

Figure 10:
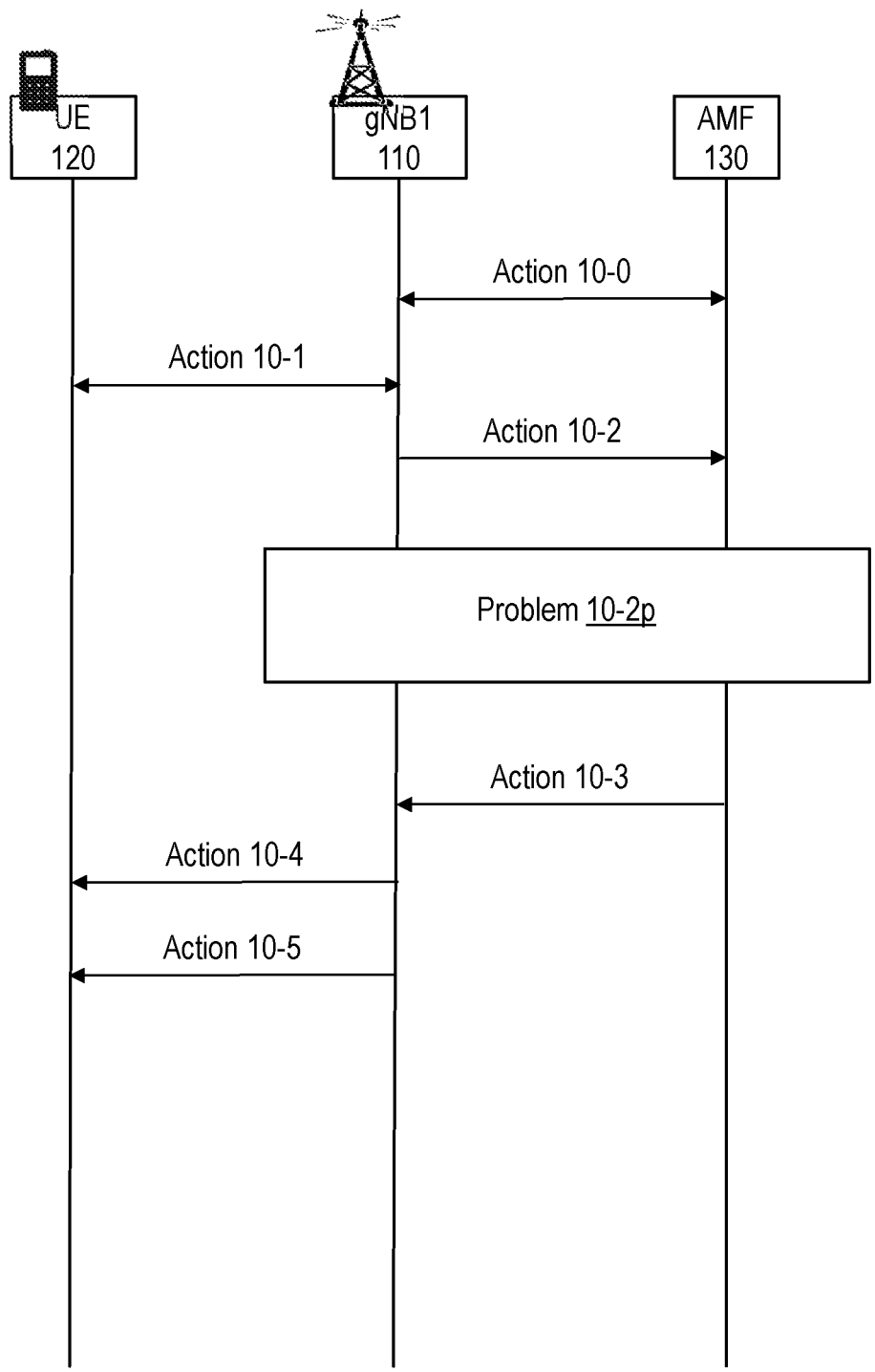
FIG. 10 is a sequence diagram illustrating embodiments of a method.
Figure 11:
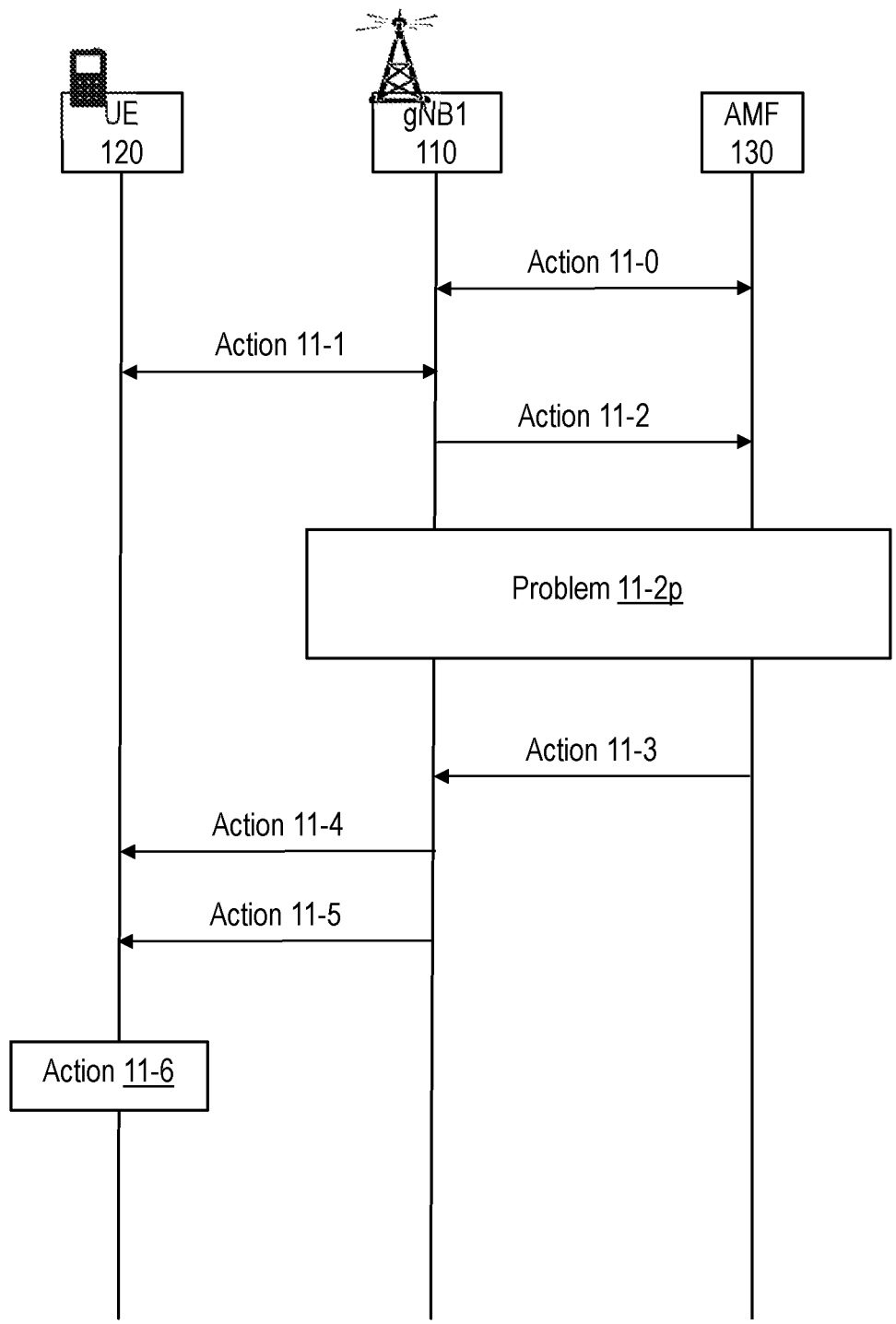
FIG. 11 is a sequence diagram illustrating embodiments of a method.
Figure 12:
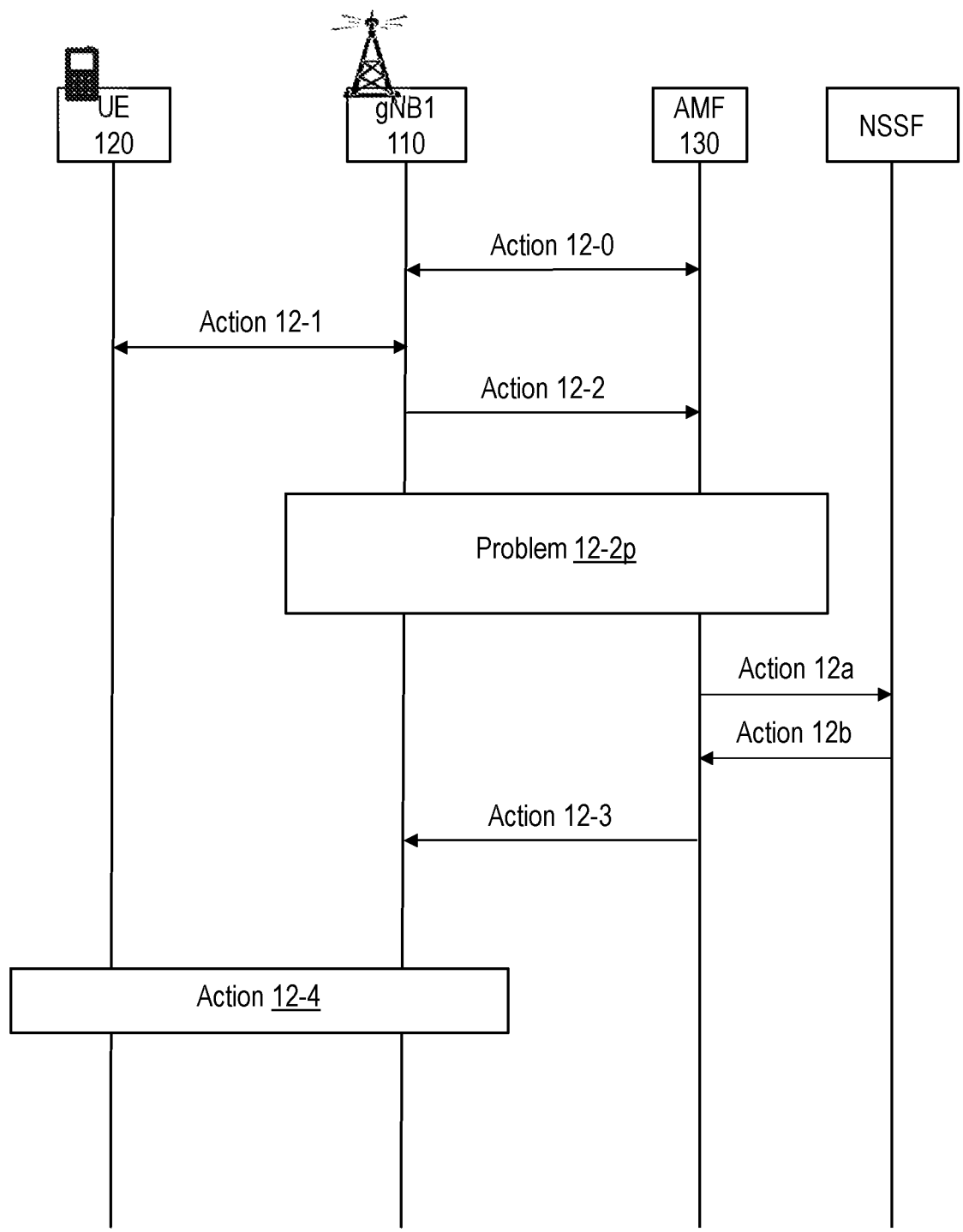
FIG. 12 is a sequence diagram illustrating embodiments of a method.

An example of the realization of embodiment B described above is presented In FIG. 10. FIG. 10 depicts assistance information from the CN node 130 to the RAN node 110 in the form of additional RSFP.

In FIG. 10, the above steps 0, 1, and 2 are the same as in Embodiment A.

Action 10-0: NG Setup: AMF learns RAN supported S-NSSAIs per TAI; RAN learns AMF supported S-NSSAIs per TAI. (Step 0)

Action 10-1: MSG1 to MSG5: No NSSAI signalled by UE, if default behaviour assumed. (Step 1)

Action 10-2: NG: Initial UE Message, including NAS service Request and Requested NSSAI. (Step 2)

Problem 10-2p occurs: UE Requests S-NSSAI #2, supported on TAI #2 on Frequency #2, while UE is connected to TAI #1 on Frequency #1, not supporting 5-NSSAI #2. At this stage RAN does not know the UE's requested NSSAI.

Action 10-3: NG: Initial Context Setup, no PDU Session Resource Setup Request List included; NAS rejection; Additionally: It may include the RFSP providing frequency prio that can steer UE to right TAI. (Step 3)

Action 10-4: RRC Reconfig with appropriate frequency prio. (Step 4)

Action 10-5: RRC Release. (Step 5)

In Step 3 the CN node 130 may send to the RAN node 110 the indication of a new area priority policy associated to the one or more network slices that are requested by the UE 120, such as a new indication of RAT/Frequency priority policy. This indication may either be derived from the already signalled RFSP index (i.e. the existing RFSP points at frequencies where the Requested NSSAI is served) or it may be derived from a new IE signalled from 5GC to RAN, e.g. a new RFSP for the UE Requested NSSAI which herein may be called Target RFSP IE. This new information is used by the RAN such as e.g. the RAN node 110 to release and redirect the UE 120 to the frequency and TAI where the Requested NSSAI is served. The same options after step 3, described in Embodiment A, are valid for this embodiment. Step 3 relates to Actions 904 and 1003 described above.

As an example of how the CN node 130 may steer the RAN such as e.g. RAN node 110 to take the appropriate action for the UE 120, absence of PDU Session Resource Setup Request List in Initial Context Setup may be used by the CN node 130 as a way to inform the RAN node 110 that the new RFSP shall be taken into account and that the UE 120 shall be released and redirected to the appropriate frequency/TAI or that the UE shall be released after being configured with the frequency priority derived from the new RFSP.

Embodiment C

An example of the realization of embodiment C described above is presented In FIG. 11.

In the figure above steps 0, 1, and 2 are the same as in Embodiment A.

Action 11-0: NG Setup: AMF learns RAN supported S-NSSAIs per TAI; RAN learns AMF supported S-NSSAIs per TAI. (Step 0)

Action 11-1: MSG1 to MSG5: No NSSAI signalled by UE, if default behaviour assumed. (Step 1)

Action 11-2: NG: Initial UE Message, including NAS service Request and Requested NSSAI. (step 2)

Problem 11-2p occurs: UE Requests S-NSSAI #2, supported on TAI #2 on Frequency #2, while UE is connected to TAI #1 on Frequency #1, not supporting S-NSSAI #2. At this stage RAN does not know the UE's requested NSSAI.

Action 11-3: NG: Initial Context Setup, no PDU Session Resource Setup Request List included; NAS message; Additionally: It may include the RFSP providing frequency prio that can steer UE to right TAI if the rejected S-NSSAIs were to be used, Rejected S-NSSAIs. (Step3)

Action 11-4: RRC Reconfig with appropriate frequency prio, NAS message. (Step 4)

Action 11-5: RRC Release, new additional cellReselectionPriorities. (Step 5)

Action 11-6: UE either follows existing cellReselectionPriorities or the new additional cellReselectionPriorities, for the rejected S-NSSAIs. (Step 6)

After step 2, within the 5GC (not shown), it is assumed that 5GC derives S-NSSAIs that may be used in the current TAI, e.g. subset of what the UE 120 requested (in Requested NSSAI) or default subscribed S-NSSAIs (i.e. Subscribed S-NSSAIs marked as default). The internal 5GC logic, such as e.g. CN node 130 logic, is as per current standard.

In step 3, the CN node 130 sends

For the UE 120, a NAS message that either is a NAS reject message or an accept message with one or more rejected S-NSSAIs (e.g. rejected for the Registration Area or new cause value), to the RAN node 110, the indication of a new area priority policy associated to the one or more network slices that are requested by the UE 120, such as a new indication of RAT/Frequency priority policy (i.e. the RFSP that would be used in case the S-NSSAIs part of the rejected S-NSSAIs were to be used) and one or more Rejected S-NSSAIs (i.e. same as sent to the UE 120).

Step 3 relates to Actions 904 and 1003 described above.

In step 4, the RAN node 110 forwards the NAS message to the UE 120, and the RAN node 110 may configure the frequencies for the current connection as appropriate for the S-NSSAIs of what was accepted (as per current logic). Namely, the RAN node 110 may configure the UE 120 to prioritize frequencies for the cell the UE 120 is connected to, or it might decide to immediately change the frequency priority as described below.

In step 5, the RAN node 110 uses the additional RFSP to provide "additional" cellReselectionPriorities to the UE 120 (for the rejected S-NSSAIs) and releases the RRC connection with current cellReselectionPriorities as appropriate for the S-NSSAIs of what was accepted (as per current logic).

Step 5 relates to Actions 905 described above.

The UE 120 may then either use what was accepted, or use the additional info (i.e. additional cellReselectionPriorities from AS and Rejected S-NSSAIs from NAS) to select another coverage layer and issues a new NAS Registration request (e.g. Without GUAMI in RRC and with Requested NSSAI as per the rejected S-NSSAIs) from the newly selected RAN to an appropriately selected CN node such as AMF or SMF.

Embodiment D

An example of the realization of embodiment D described above is presented In FIG. 12.

Action 12-0: NG Setup: AMF learns RAN supported S-NSSAIs per TAI; RAN learns AMF supported S-NSSAIs per TAI. Optionally AMF also learns overlapping TAISs per cell. (Step 0)

Action 12-1: MSG1 to MSG5: No NSSAI signalled by UE, if default behaviour assumed. (Step 1)

Action 12-2: NG: Initial UE Message, including NAS service Request and Requested NSSAI. Optionally AMF also gets overlapping TAIs per current cell. (Step 2)

Problem 12-2p occurs: UE Requests S-NSSAI #2, supported on TAI #2 on Frequency #2, while UE is connected to TAI #1 on Frequency #1, not supporting S-NSSAI #2.

Action 12-2a: Nnssf_NSSelection_Get Requested NSSAI, TAI etc. and new overlapping TAIs.

Action 12-2b: Nnssf_NSSelection_Get response, Allowed NSSAI etc. and new Allowed NSSAI etc. for overlapping TAI, i.e. for on or per TAI.

Action 12-3: NG: Initial Context Setup, NAS message; Additionally: It may include the RFSP, or new indication, e.g. TAI, providing frequency prio that can steer UE to right overlapping TAI. (Step 3)

Action 12-4: RAN forwards the NAS message and then triggers HO or release with redirection, to move the UE to a cell as per the RFSP and overlapping TAI. (Step 4) In Initial UE 120 message (i.e. step 2), or during NGAP SETUP (i.e. step 0), NG-RAN such as e.g. RAN node 110 includes "overlapping TAIs" per TAI per cell to the AMF 130. Or NSSF is configured with the information by O&M, i.e. not shown in the figure.

When the UE 120 tries to Register and the Requested NSSAI cannot be served by current TAI/RA, the AMF 130 (if information is available) checks overlapping TAIs and if a TAI can serve the Requested NSSAI AMF forwards that or both options to NSSF for slice selection in step 2a.

A CN node, such as an NSSF uses the overlapping TAI information received from the AMF 130 in step 2a (or configured by O&M) and replies back with Allowed NSSAI for one TAI or for current TAI and overlapping TAI(s), step 2b. If NSSF provides Allowed NSSAI etc (see Nnssf_NS-Selection_Get response for current information) for one TAI, then the NSSF may decide best option for the user e.g. based on priority of the S-NSSAIs.

The AMF 130 such as e.g. CN node 130 creates NAS message according to best option for user (if multiple options e.g. Slice priority etc) and Initial Context Setup includes NAS message, and if the selected option is for a TAI that is not the current TAI, then AMF provides info to RAN node 110 to steer to overlapping TAI (using RFSP or new indication).

Options to Control UP

Embodiment E

Figure 13:
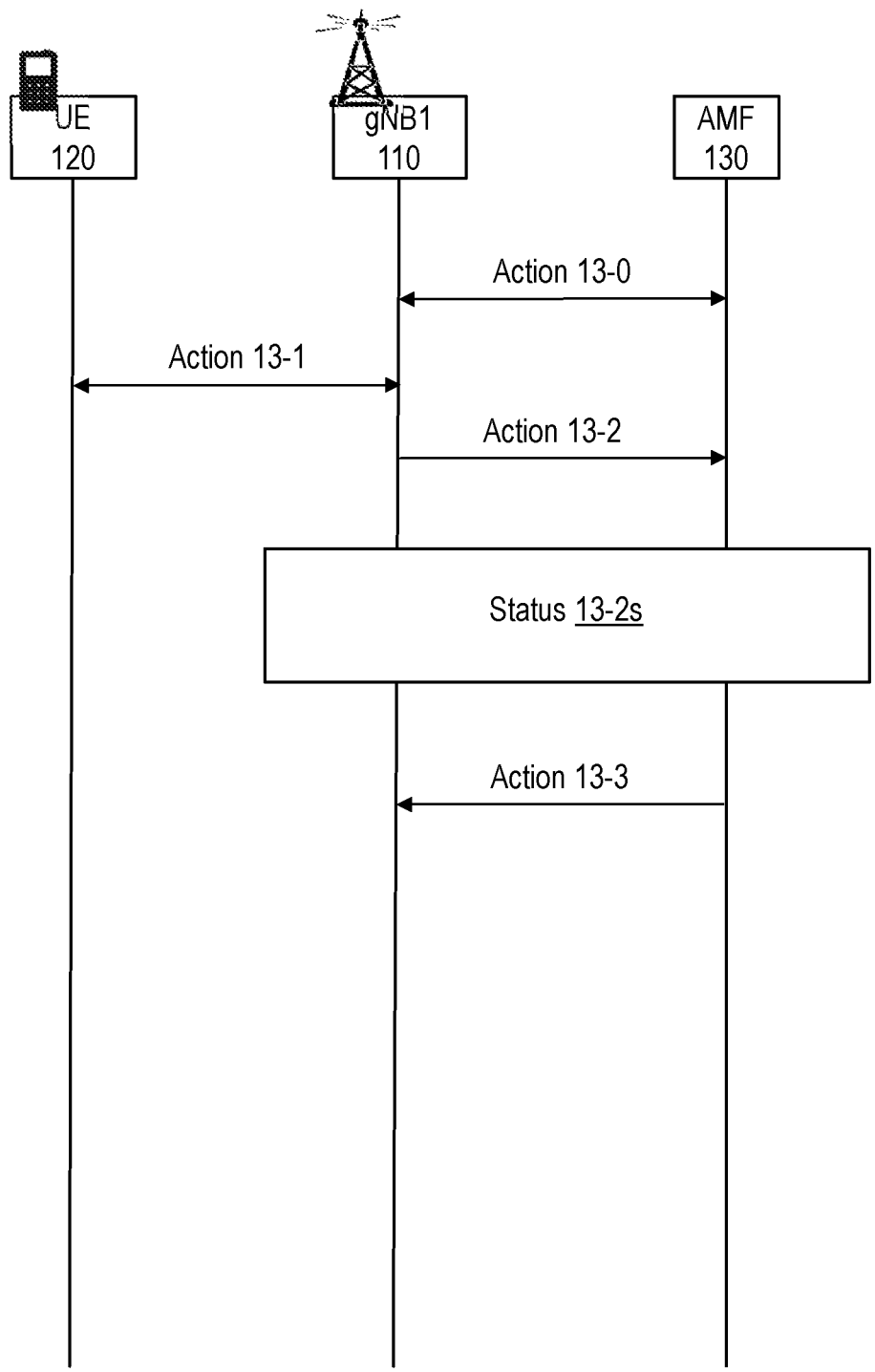
FIG. 13 is a sequence diagram illustrating embodiments of a method.

An example of the realization of embodiment E described above is presented In FIG. 13. FIG. 13 depicts an Example of UP steering to frequencies supporting the Requested NSSAI.

Action 13-0: NG Setup: AMF learns RAN supported S-NSSAIs per TAI; RAN learns AMF supported S-NSSAIs per TAI. (Step 0)

Action 13-1: MSG1 to MSG5: No NSSAI signalled by UE, if default behaviour assumed. (Step 1)

Action 13-2: NG: Initial UE Message, including NAS service Request and Requested NSSAI. (Step 2)

Status 13-2s: UE is on an RA supporting the requested NSSAI. No issue so far.

Action 13-3: NG: Initial Context Setup, includes the Allowed NSSAI and PDU Session Setup Request. (Step 3)

In this example steps 0, 1, 2 are the same as in previous examples. However, the NG RAN such as e.g. RAN node 110 is configured in a way that CP requests to setup PDU Session Resources for the UE Requested NSSAI will be granted, but such resources may not be allocated over the UP, or they may be allocated for a very limited time.

Therefore the CN node 130 may be configured (i.e. in step 0 by RAN and NSSF by O&M—not shown in the figure) as to accept S-NSSAIs in the TAI even if the S-NSSAIs are only allowed to use CP resources in the TAI (i.e. such S-NSSAIs are seen as available in the TAI).

After Step 3 in fact, the NG-RAN such as e.g. RAN node 110 may handover (HO) the UE 120 to another cell belonging to a TAI where the Requested NSSAI is supported. The UP resources for the Requested NSSAI will therefore be setup in the HO target cell. The change of TAI will cause the UE 120 to perform a new Mobility Registration as per current standard. Alternatively, NG-RAN such as e.g. RAN node 110 configures the UP resources in the appropriate frequency/cell using Carrier Aggregation or Dual Connectivity, while keeping the CP anchor in current RA.

Step 3 relates to Actions 904 and 1003 described above.

Figure 14:
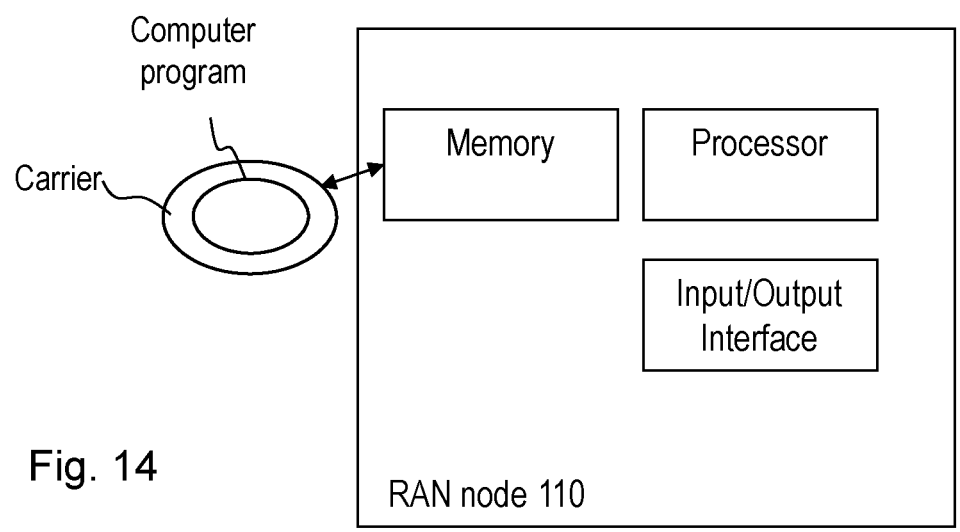
FIG. 14 is a schematic block diagram illustrating embodiments of a RAN node.
Figure 15:
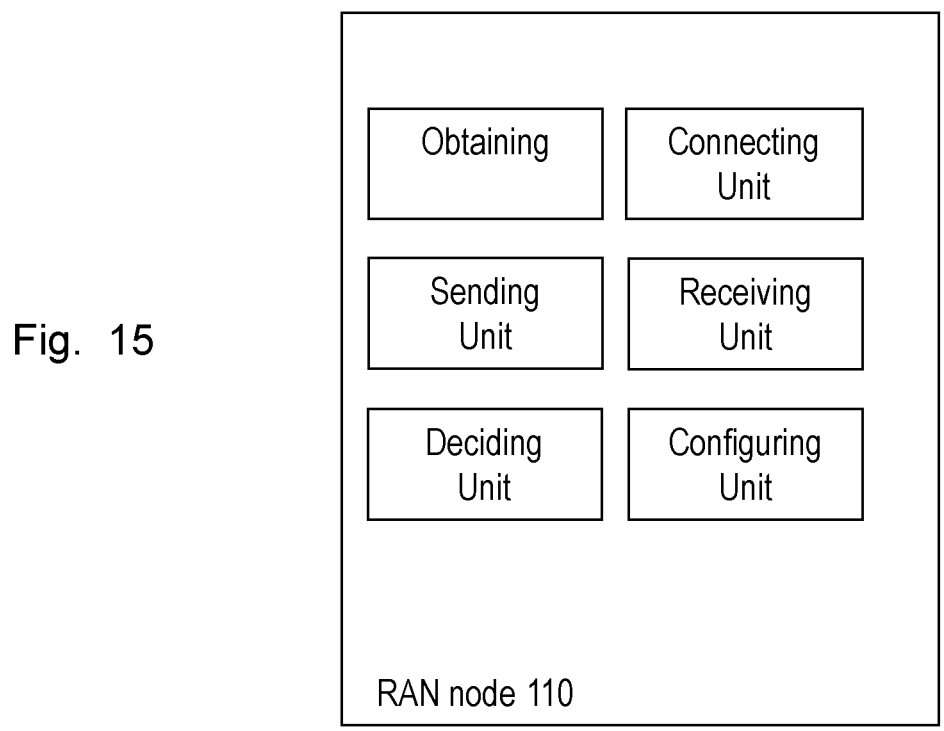
FIG. 15 is a schematic block diagram illustrating embodiments of a RAN node.

FIG. 14 and FIG. 15 shows an example of arrangement in the RAN node 110.

The RAN node 110 may comprise an input and output interface configured to communicate with each other. The input and output interface may comprise a wireless receiver (not shown) and a wireless transmitter (not shown).

The RAN node 110 may comprise an obtaining unit, a connecting unit, a sending unit, receiving unit, a deciding unit, and a configuring unit to perform the method actions as described herein.

The embodiments herein may be implemented through a respective processor or one or more processors, such as the processor of a processing circuitry in the RAN node 110 depicted in FIG. 16a, together with computer program code for performing the functions and actions of the embodiments herein. The program code mentioned above may also be provided as a computer program product, for instance in the form of a data carrier carrying computer program code for performing the embodiments herein when being loaded into the RAN node 110. One such carrier may be in the form of a CD ROM disc. It is however feasible with other data carriers such as a memory stick. The computer program code may furthermore be provided as pure program code on a server and downloaded to the RAN node 110.

The RAN node 110 may further comprise respective a memory comprising one or more memory units. The memory comprises instructions executable by the processor in the RAN node 110.

The memory is arranged to be used to store instructions, data, configurations, and applications to perform the methods herein when being executed in the RAN node 110.

In some embodiments, a computer program comprises instructions, which when executed by the at least one processor, cause the at least one processor of the RAN node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the RAN node 110, described below may refer to a combination of analog and digital circuits, and/or one or more processors configured with software and/or firmware, e.g. stored in the RAN node 110, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 16:
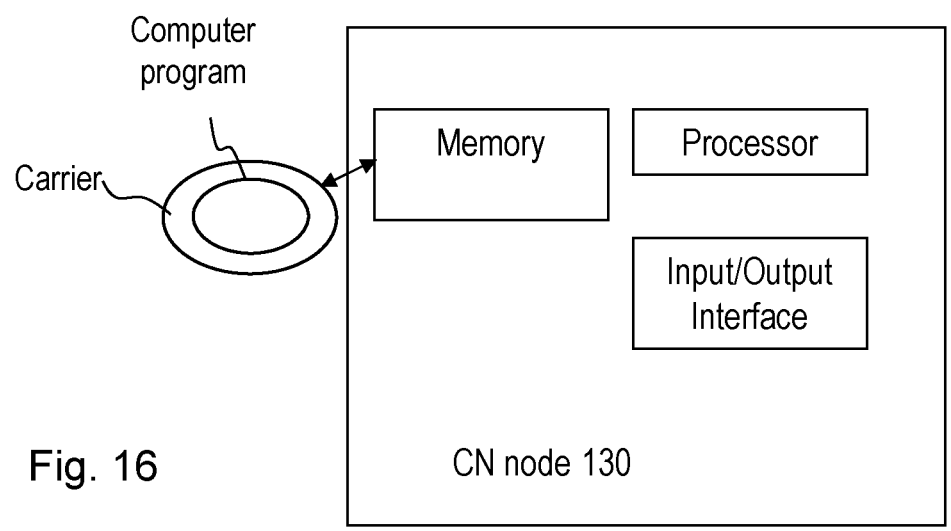
FIG. 16 is a schematic block diagram illustrating embodiments of a CN node.
Figure 17:
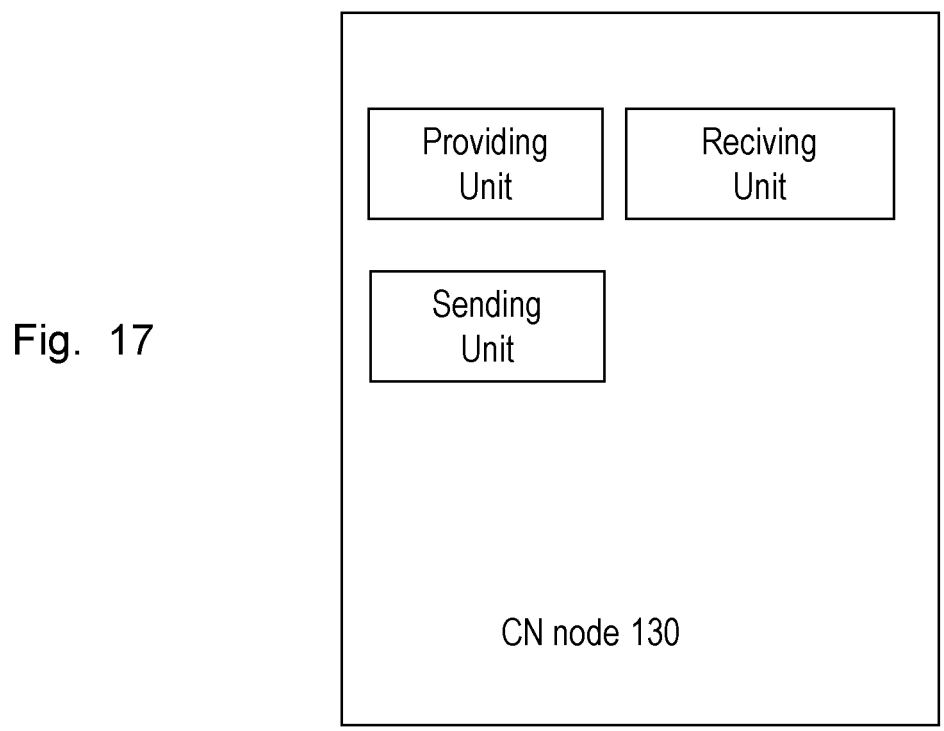
FIG. 17 is a schematic block diagram illustrating embodiments of a CN node.

FIG. 16 and FIG. 17 shows an example of arrangements in the CN node 130.

The CN node 130 may comprise an input and output interface configured to communicate with each other. The input and output interface may comprise a wireless receiver (not shown) and a wireless transmitter (not shown).

The CN node 130 may comprise a providing unit, a receiving unit, a and a sending unit configured to perform the method actions as described herein.

The embodiments herein may be implemented through a respective processor or one or more processors, such as the processor of a processing circuitry in the CN node 130 depicted in FIG. 17a, together with respective computer program code for performing the functions and actions of the embodiments herein. The program code mentioned above may also be provided as a computer program product, for instance in the form of a data carrier carrying computer program code for performing the embodiments herein when being loaded into the CN node 130. One such carrier may be in the form of a CD ROM disc. It is however feasible with other data carriers such as a memory stick. The computer program code may furthermore be provided as pure program code on a server and downloaded to the CN node 130.

The CN node 130 may further comprise respective a memory comprising one or more memory units. The memory comprises instructions executable by the processor in the CN node 130.

The memory is arranged to be used to store instructions, data, configurations, and applications to perform the methods herein when being executed in the CN node 130.

In some embodiments, a computer program comprises instructions, which when executed by the at least one processor, cause the at least one processor of the CN node 130 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the CN node 130, described below may refer to a combination of analog and digital circuits, and/or one or more processors configured with software and/or firmware, e.g. stored in the CN node 130, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-34 are shortly described. See e.g. FIGS. 6, 7, 8, and 14-17.

Embodiment 1. A method performed by a Radio Access Network, RAN, node 110, e.g. for handling an service request from a User Equipment, UE, 120 in a wireless communications network 100, which RAN node 110 supports a first network slice in a first Area, A1, e.g. RA1 TAI1, and which RAN node 110 further supports a second network slice in a second Area, A2, e.g. RA2, TAI2, the method comprising any one or more out of:

connecting 902 to the UE 120 via A1, e.g. on behalf of the UE, 120 sending 903 to a Core Network, CN, node 130, e.g. AMF, a service request from the UE 120, which request may either be transparent to the RAN node or it may be visible to the RAN node, which service request relates to, e.g. indicates, a network slice that the UE 120 requests in a certain Area, e.g. RA, TA, e.g. obtained by UE default behavior or received in the request in the message, The RAN node may forwards a service request or registration request to the CN *on behalf of* the UE. The RAN node does not have visibility of what is inside the message that performs registration/service request, receiving 904 an indication from the CN node 130, which indication indicates the one or more network slices requested by the UE together with any one or more out of:

a list of network slices that are allowed to be accessed by the UE in the current first area A1, an indication of a new area priority policy, e.g. in the form of an Index to RAT/Frequency Selection Priority information element, associated to the list of network slices that are requested by the UE 120, deciding 905 how to handle the service request from the UE 120 based on the indication received from the CN node 130.

Embodiment 2. The method according to embodiment 1, wherein deciding 905 how to handle the service request from the UE 120 based on the indication received from the CN node 130 comprises deciding to perform UE 120 mobility, e.g. release, redirection or handover, to the area where the network slices requested by the UE are supported.

Embodiment 3. The method according to any of the embodiments 1-2, where the Area, e.g. certain area A1, A2, is constituted by a Registration Area and/or a Tracking Area and/or a cell and/or a frequency.

Embodiment 4. The method according to any of the embodiments 1-3, wherein the deciding 905 how to handle the service request from the UE 120 based on the indication received from the CN node 130 comprises:

comparing the received list of Allowed network slices and the list of requested network slices with the network slices supported in the area where the UE 120 is currently served Embodiment 5. The method according to embodiment 4, where as a result of the comparison between the received list of Allowed and requested network slices and the network slices supported in the area where the UE 120 is currently served, deciding whether to move the UE 120 connection, e.g. via handover or release or redirection, to a different area where the requested network slices are supported.

Embodiment 6. The method according to any of the embodiments 1-5, wherein receiving 904 an indication from the CN node 130 further comprises, receiving from the CN node 130, an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

Embodiment 7. The method according to any of the embodiments 1-6, further comprising:

configuring 906 the UE 120 with a new RAT and/or frequency priority configuration in order to allow the UE 120 to connect to the area that supports the requested network slices.

Embodiment 8. The method according to any of the embodiments 1-7, further comprising:

obtaining 901 from the the CN node 130, information that the RAN node 110 supports the first network slice in A1, and that the RAN node 110 further supports the second network slice in A2.

Embodiment 9. The method according to any of the embodiment 1-8, wherein the indication received from the CN node 130 comprises any one out of:

an RFSP, or a SPID a list of S-NSSAIs, an RFSP, or a SPID, and list of S-NSSAIs.

Embodiment 10. The method according to any of the embodiment 1-8, wherein the indication received from the CN node 130 enables the RAN node 110 to derive any one out of:
- an RFSP, or a SPID
- a list of S-NSSAIs,
- an RFSP, or a SPID, and list of S-NSSAIs.

Embodiment 11. A computer program comprising instructions, which when executed by a processor, causes the processor to perform actions according to any of the embodiments 1-10.

Embodiment 12. A carrier comprising the computer program of embodiment 11, wherein the carrier is one of an electronic signal, an optical signal, an electromagnetic signal, a magnetic signal, an electric signal, a radio signal, a microwave signal, or a computer-readable storage medium.

Embodiment 13. A method performed by a Core Network, CN, node 130, e.g. AMF, e.g. for handling an service request from a User Equipment, UE, 120 in a wireless communications network 100, the method comprising
providing 1001 to a Radio Access Network, RAN, node 110, information that the RAN node 110 supports the first network slice in A1, and that the RAN node 110 further supports the second network slice in A2,
receiving 1002 a message from the RAN node 110, which message, indicates a network slice that the UE 120 has requested in the certain Area,
sending 1003 an indication the RAN node 110, which indication indicates the one or more network slices requested by the UE together with any one or more out of:
  a list of network slices that are allowed to be accessed by the UE in the current first area A1,
  an indication of a new area priority policy, e.g. in the form of an Index to RAT/Frequency Selection Priority information element, associated to the list of network slices that are requested by the UE 120, Embodiment 14. The method according to embodiment 13, where the Area, e.g. certain area A1, A2, is constituted by a Registration Area and/or a Tracking Area and/or a cell and/or a frequency.

Embodiment 15. The method according to any of the embodiments 13-14, wherein sending 1003 an indication the RAN node 110, further comprises, sending an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

Embodiment 16. The method according to any of the embodiments 13-15, wherein the indication sent to the RAN node 110 comprises any one out of:
- an RFSP, or a SPID
- a list of S-NSSAIs,
- an RFSP, or a SPID, and list of S-NSSAIs Embodiment 17. The method according to any of the embodiment 13-15, wherein the indication sent to the RAN node 110 enables the RAN node 110 to derive any one out of:
- an RFSP, or a SPID
- a list of S-NSSAIs,
- an RFSP, or a SPID, and list of S-NSSAIs.

Embodiment 18. A computer program comprising instructions, which when executed by a processor, causes the processor to perform actions according to any of the embodiments 13-17.

Embodiment 19. A carrier comprising the computer program of embodiment 18, wherein the carrier is one of an electronic signal, an optical signal, an electromagnetic signal, a magnetic signal, an electric signal, a radio signal, a microwave signal, or a computer-readable storage medium.

Embodiment 20. A Radio Access Network, RAN, node 110, e.g. configured to handle an service request from a User Equipment, UE, 120 in a wireless communications network 100, which RAN node 110 is adapted to support a first network slice in a first Area, A1, e.g. RA1 TAI1, and which RAN node 110 further supports a second network slice in a second Area, A2, e.g. RA2, TAI2, the RAN node 110 being further configured to any one or more out of:
connect 902 to the UE 120 via A1, e.g. by means of a connecting unit in the RAN node 110,
e.g. on behalf of the UE, 120 send 903 to a Core Network, CN, node 130, e.g. by means of a sending unit in the RAN node 110, e.g. AMF, a service request from the UE 120, which request may either be transparent to the RAN node or it may be visible to the RAN node, which service request is adapted to relate to, e.g. indicates, a network slice that the UE 120 requests in a certain Area, e.g. RA, TA, e.g. obtained by UE default behavior or received in the request in the message, the RAN node may forward a service request or registration request to the CN node 130 *on behalf of* the UE 120. The RAN node does not have visibility of what is inside the message that performs registration/service request, receive 904 an indication from the CN node 130, e.g. by means of a receiving unit in the RAN node 110, which indication is adapted to indicate the one or more network slices requested by the UE together with any one or more out of:
  a list of network slices that are allowed to be accessed by the UE in the current first area A1,
  an indication of a new area priority policy, e.g. in the form of an Index to RAT/Frequency Selection Priority information element, associated to the list of network slices that are requested by the UE 120,
decide 905 how to handle the service request from the UE 120 based on the indication received from the CN node 130, e.g. by means of a deciding unit in the RAN node 110.

Embodiment 21. The RAN node 110 according to embodiment 20, further being configured to decide 905 how to handle the service request from the UE 120 based on the indication received from the CN node 130 by deciding to perform UE 120 mobility, e.g. release, redirection or handover, to the area where the network slices requested by the UE are supported.

Embodiment 22. The RAN node 110 according to any of the embodiments 20-21, where the Area, e.g. certain area A1, A2, is adapted to constitute a Registration Area and/or a Tracking Area and/or a cell and/or a frequency.

Embodiment 23. The RAN node 110 according to any of the embodiments 20-22, further being configured to decide 905 how to handle the service request from the UE 120 based on the indication received from the CN node 130 by further:
compare the received list of Allowed network slices and the list of requested network slices with the network slices supported in the area where the UE 120 is currently served Embodiment 24. The RAN node 110 according to embodiment 23, where as a result of the comparison between the received list of Allowed and requested network slices and the network slices supported in the area where the UE 120 is currently served, further being configured to decide whether to move the UE 120 connection, e.g. via handover or release or redirection, to a different area where the requested network slices are supported.

Embodiment 25. The RAN node 110 according to any of the embodiments 20-24, further being configured to receive 904 an indication from the CN node 130 by, receiving from the CN node 130, an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

Embodiment 26. The RAN node 110 according to any of the embodiments 20-25, further being configured to:
configure 906 the UE 120 with a new RAT and/or frequency priority configuration in order to allow the UE 120 to connect to the area that supports the requested network slices, e.g. by means of a configuring unit in the RAN node 110.

Embodiment 27. The RAN node 110 according to any of the embodiments 20-26, further being configured to:
obtain 901 from the the CN node 130, information that the RAN node 110 supports the first network slice in A1, and that the RAN node 110 further supports the second network slice in A2, e.g. by means of a obtaining unit in the RAN node 110.

Embodiment 28. The RAN node 110 according to any of the embodiment 20-27, wherein the indication received from the CN node 130 further is adapted to comprise any one out of:
an RFSP, or a SPID
a list of S-NSSAIs,
an RFSP, or a SPID, and list of S-NSSAIs.

Embodiment 29. The RAN node 110 according to any of the embodiment 20-27, wherein the indication received from the CN node 130 further is adapted to enable the RAN node 110 to derive any one out of:
an RFSP, or a SPID
a list of S-NSSAIs,
an RFSP, or a SPID, and list of S-NSSAIs.

Embodiment 30. A Core Network, CN, node 130, e.g. AMF, e.g. configured to handle an service request from a User Equipment, UE, 120 in a wireless communications network 100, the CN node 130 being further configured to:
provide 1001 to a Radio Access Network, RAN, node 110, information that the RAN node 110 supports the first network slice in A1, and that the RAN node 110 further supports the second network slice in A2, e.g. by means of a providing unit in the CN node 130,
receive 1002 a message from the RAN node 110, which message is adapted to indicate a network slice that the UE 120 has requested in a certain Area, e.g. by means of a receiving unit in the CN node 130,
send 1003 an indication the RAN node 110, e.g. by means of a sending unit in the CN node 130, which indication is adapted to indicate the one or more network slices requested by the UE together with any one or more out of:
a list of network slices that are allowed to be accessed by the UE in the current first area A1,
an indication of a new area priority policy, e.g. in the form of an Index to RAT/Frequency Selection Priority information element, associated to the list of network slices that are requested by the UE 120, Embodiment 31. The CN node 130 according to embodiment 30, where the Area, e.g. certain area A1, A2, is adapted to constitute a Registration Area and/or a Tracking Area and/or a cell and/or a frequency.

Embodiment 32. The CN node 130 according to any of the embodiments 30-31, further being configured to send 1003 an indication the RAN node 110, by sending an indication of whether to reserve resources to the network slices requested by the UE 120 and allowed in the A1 and supported in A1 or whether to move the UE 120 connection, e.g. via handover or release or redirection, to a new area where the network slices requested by the UE 120 but not allowed and/or not supported in the A1 is served by the RAN node 110.

Embodiment 33. The CN node 130 according to any of the embodiments 30-32, wherein the indication sent to the RAN node 110 further is adapted to comprise any one out of:
an RFSP, or a SPID
a list of S-NSSAIs,
an RFSP, or a SPID, and list of S-NSSAIs Embodiment 34. The CN node 130 according to any of the embodiment 30-32, wherein the indication sent to the RAN node 110 further is adapted to enable the RAN node 110 to derive any one out of:
an RFSP, or a SPID
a list of S-NSSAIs,
an RFSP, or a SPID, and list of S-NSSAIs.

Further Extensions and Variations

Figure 18:
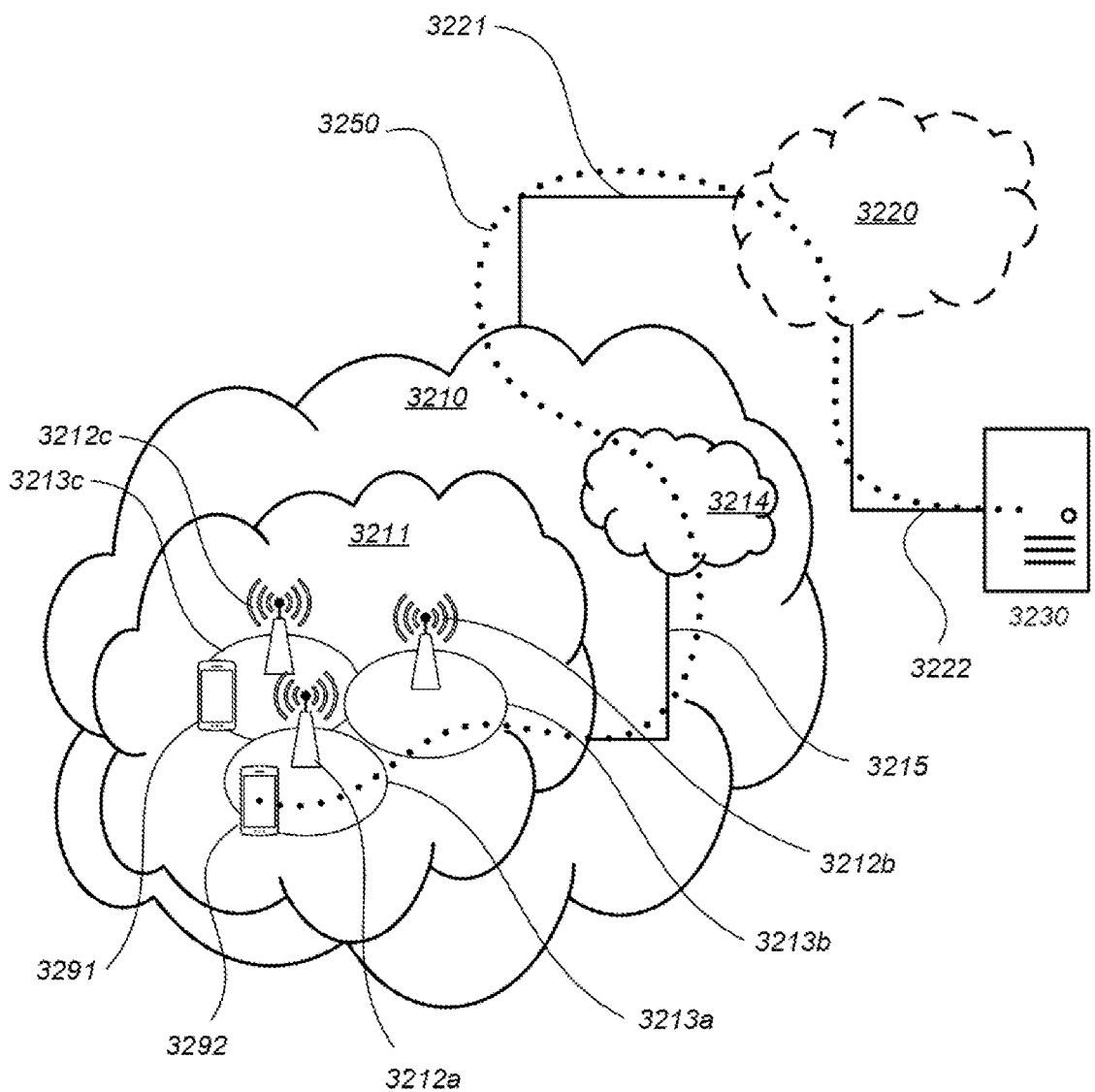
FIG. 18 schematically illustrates a telecommunication network connected via an intermediate network to a host computer.

With reference to FIG. 18, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 19) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 19:
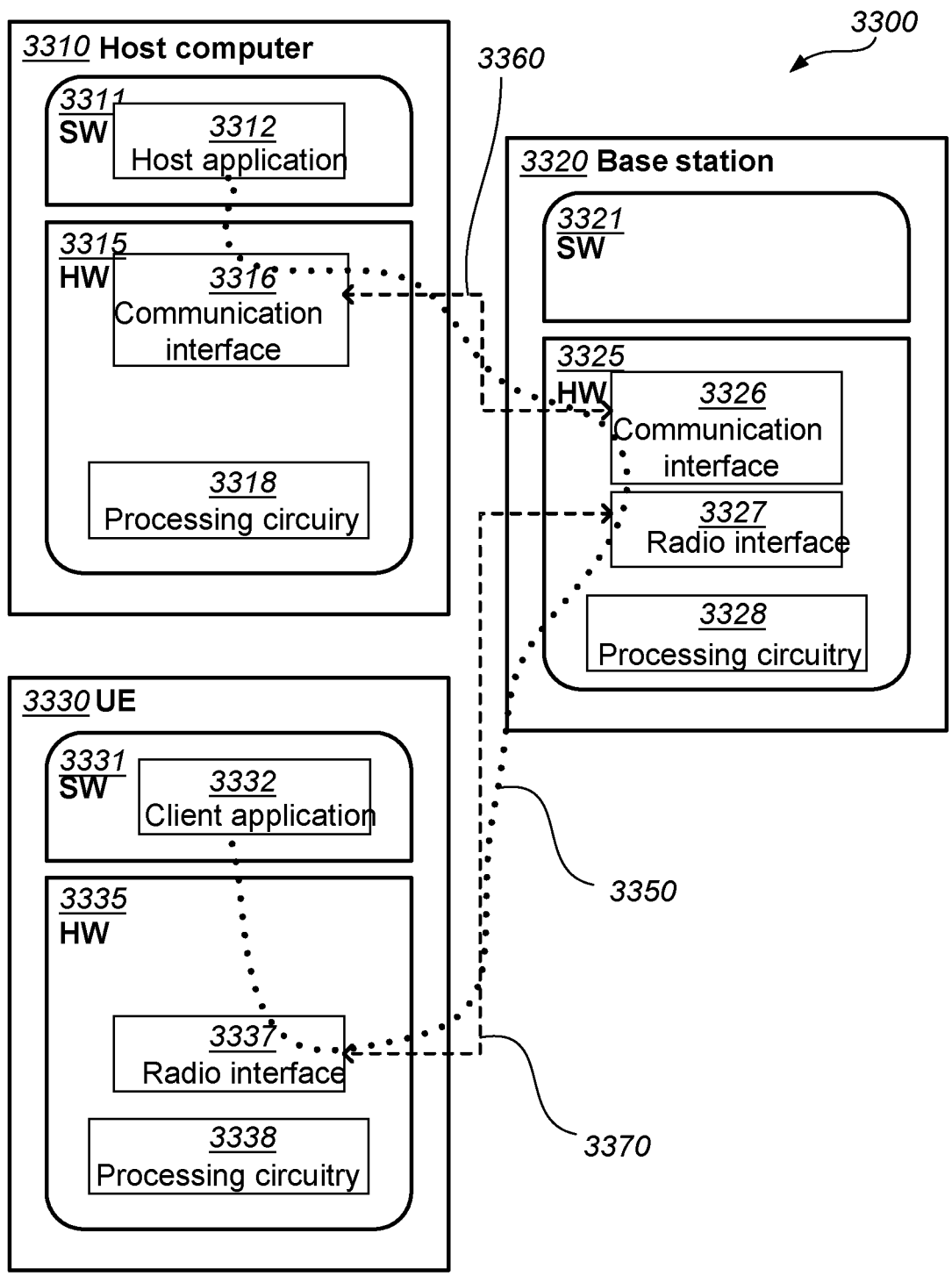
FIG. 19 is a generalized block diagram of a host computer communicating via a base station with a user equipment over a partially wireless connection.

It is noted that the host computer 3310, base station 3320 and UE 3330 illustrated in FIG. 19 may be identical to the host computer 3230, one of the base stations 3212a, 3212b, 3212c and one of the UEs 3291, 3292 of FIG. 20, respectively. This is to say, the inner workings of these entities may be as shown in FIG. 19 and independently, the surrounding network topology may be that of FIG. 18.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 20 is a flowchart illustrating a method implemented in a communication system, in accordance with one embodiment. The communication system includes a host computer, a base station such as the network node 110, and a UE such as the UE 120, which may be those described with reference to FIG. 18 and FIG. 19. For simplicity of the present disclosure, only drawing references to FIG. 20 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 21 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 22 is a flowchart illustrating a method implemented in a communication system, in accordance with one embodiment. The communication system includes a host computer, a base station such as a AP STA, and a UE such as a Non-AP STA which may be those described with reference to FIG. 18 and FIG. 19. For simplicity of the present disclosure, only drawing references to FIG. 22 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station such as an AP STA, and a UE such as a Non-AP STA which may be those described with reference to FIG. 18 and FIG. 19. For simplicity of the present disclosure, only drawing references to FIG. 23 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a Radio Access Network (RAN) node for handling a service request from a User Equipment (UE) in a wireless communications network, which RAN node supports a first network slice in a first area (A1), the method comprising:
   connecting to the UE via the first area,
   sending, to a Core Network (CN) node, a service request from the UE, the service request relating to one or more network slices that the UE requests in a certain area,
   receiving an indication from the CN node, the indication indicating the one or more network slices requested by the UE together with any one or more out of:
      a list of network slices that are allowed to be accessed by the UE in the first area,
      an indication of a new area priority policy associated to the one or more network slices that are requested by the UE,
   deciding how to handle the service request from the UE based on the indication received from the CN node, the deciding how to handle the service request from the UE based on the indication received from the CN node comprising comparing the received list of allowed network slices and the list of requested network slices with the network slices supported in the area where the UE is currently served.

2. The method of claim 1, wherein deciding how to handle the service request from the UE based on the indication received from the CN node comprises deciding to perform UE mobility to an area where the network slices requested by the UE are supported.

3. The method of claim 1, wherein each area is constituted by a registration area and/or a tracking area and/or a cell and/or a frequency.

4. The method of claim 1, where as a result of the comparison between the received list of Allowed and requested network slices and the network slices supported in the area where the UE is currently served, deciding whether to move the UE connection, to a different area where the requested network slices are supported.

5. The method of claim 1, further comprising:
configuring the UE with a new RAT and/or frequency priority configuration in order to allow the UE to connect to the area that supports the requested network slices.

6. The method of claim 1, the method further comprising:
obtaining, from the the CN node, information that the RAN node supports the first network slice in the first area, and that the RAN node further supports a second network slice in a second area (A2).

7. A non-transitory computer-readable medium comprising, stored thereupon, a computer program comprising instructions configured so that, when executed by a processor, the instructions cause the processor to perform the steps of claim 1.

8. A method performed by a Core Network (CN) node for handling a service request from a User Equipment (UE) in a wireless communications network, the method comprising:
providing to a Radio Access Network (RAN) node, information that the RAN node supports a first network slice in a current first area (A1),
receiving a message from the RAN node, which message, indicates one or more requested network slices that the UE has requested in a certain area,
sending an indication to the RAN node, which indication indicates the one or more network slices requested by the UE together:
a list of network slices that are allowed to be accessed by the UE in the current first area, and
an indication of a new area priority policy associated to the one or more network slices that are requested by the UE,
the sending the indication to the RAN node comprising sending an indication of:
whether to reserve resources to the one or more network slices requested by the UE and allowed and supported in the current first area, or
whether to move the UE connection to a new area where one or more of the requested network slices that are one or both of not allowed and not supported in the current first area are served by the RAN node.

9. The method of claim 8, where each area is constituted by a registration area and/or a tracking area and/or a cell and/or a frequency.

10. A non-transitory computer-readable medium comprising, stored thereupon, a computer program comprising instructions configured so that, when executed by a processor, the instructions cause the processor to perform the steps of claim 8.

11. A Radio Access Network (RAN) node configured to handle a service request from a User Equipment (UE) in a wireless communications network, which RAN node is adapted to support a first network slice in a first area (A1), the RAN node further being configured to:
connect to the UE via the first area,
on behalf of the UE, send to a Core Network (CN) node, a service request from the UE, the service request being configured to relate to, a network slice that the UE requests in a certain area,
receive an indication from the CN node, the indication being configured to indicate the one or more network slices requested by the UE together with any one or more out of:
a list of network slices that are allowed to be accessed by the UE in the first area,
an indication of a new area priority policy associated to the list of network slices that are requested by the UE,
decide how to handle the service request from the UE based on the indication received from the CN node, the deciding how to handle the service request from the UE based on the indication received from the CN comprising comparing the received list of allowed network slices and the list of requested network slices with the network slices supported in the area where the UE is currently served.

12. The RAN node of claim 11, further being configured to decide how to handle the service request from the UE based on the indication received from the CN node by deciding to perform UE mobility, to an area where the network slices requested by the UE are supported.

13. The RAN node of claim 11, where each area constitutes a registration area and/or a tracking area and/or a cell and/or a frequency.

14. The RAN node of claim 11, wherein the RAN node is further configured to, as a result of the comparison between the received list of Allowed and requested network slices and the network slices supported in the area where the UE is currently served, decide whether to move the UE connection to a different area where the requested network slices are supported.

15. The RAN node of claim 13, further being configured to:
configure the UE with a new RAT and/or frequency priority configuration in order to allow the UE to connect to the area that supports the requested network slices.

16. The RAN node of claim 11, further being configured to:
obtain from the the CN node, information that the RAN node supports the first network slice in the first area, and that the RAN node further supports a second network slice in a second area (A2).

17. A Core Network (CN) node, configured to handle a service request from a User Equipment (UE) in a wireless communications network, the CN node being further configured to:
provide to a Radio Access Network (RAN) node, information that the RAN node supports a first network slice in a current first area (A1),
receive a message from the RAN node, which message is adapted to indicate a requested network slice that the UE has requested in a certain area,
send an indication to the RAN node, which indication is adapted to indicate the one or more network slices requested by the UE together with:
a list of network slices that are allowed to be accessed by the UE in the current first area, and
an indication of a new area priority policy associated to the one or more network slices that are requested by the UE,
the sending the indication to the RAN node comprising sending an indication of:
whether to reserve resources to the one or more network slices requested by the UE and allowed and supported in the current first area, or
whether to move the UE connection to a new area where one or more of the requested network slices that are one or both of not allowed and not supported in the current first area are served by the RAN node.

18. The CN node of claim 17, where each area constitutes a registration area and/or a tracking area and/or a cell and/or a frequency.

* * * * *